US011061789B2

United States Patent
Ding et al.

(10) Patent No.: US 11,061,789 B2
(45) Date of Patent: *Jul. 13, 2021

(54) FACILITATING CLASSIFICATION OF EQUIPMENT FAILURE DATA

(71) Applicant: International Business Machines Corporation, Armonk, NY (US)

(72) Inventors: Jing Ding, Pudong new district (CN); Jing Li, Beijing (CN); Ji Jiang Song, Chaoyang District (CN); Jian Wang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 722 days.

This patent is subject to a terminal disclaimer.

(21) Appl. No.: 15/842,561

(22) Filed: Dec. 14, 2017

(65) Prior Publication Data
US 2018/0357568 A1    Dec. 13, 2018

Related U.S. Application Data

(63) Continuation of application No. 15/617,860, filed on Jun. 8, 2017.

(51) Int. Cl.
*G06N 20/00* (2019.01)
*G06F 11/00* (2006.01)
(Continued)

(52) U.S. Cl.
CPC .......... *G06F 11/2257* (2013.01); *G06F 11/00* (2013.01); *G06F 16/22* (2019.01);
(Continued)

(58) Field of Classification Search
CPC ...... G06N 20/00; G06F 16/22; G06F 16/2365
(Continued)

(56) References Cited

U.S. PATENT DOCUMENTS 4,051,427 A * 9/1977 Kilgore .................... G06G 7/64
                                                          322/99
9,280,517 B2 * 3/2016 Liu ....................... E21B 43/127
(Continued)

OTHER PUBLICATIONS

Non-Final Office Action received for U.S. Appl. No. 15/617,860 dated Jul. 6, 2020, 54 pages.
(Continued)

*Primary Examiner* — Baboucarr Faal
*Assistant Examiner* — Em N Trieu
(74) *Attorney, Agent, or Firm* — Amin, Turocy & Watson, LLP

(57) ABSTRACT

The subject disclosure relates to employing grouping and selection components to facilitate a grouping of failure data associated with oil and gas exploration equipment into one or more equipment failure type groups. In an example, a method comprises grouping, by a system operatively coupled to a processor, training data of a set of equipment failure data into one or more failure type groups based on one or more determined failure criteria, wherein the one or more failure type groups represent equipment failure classifications associated with energy exploration processes; and selecting, by the system, first ungrouped data from the set of equipment failure data based on a level of similarity between the first ungrouped data and the training data.

4 Claims, 14 Drawing Sheets

(51) Int. Cl.
*G06N 5/04* (2006.01)
*G06F 11/22* (2006.01)
*G06F 16/22* (2019.01)
*G06F 16/23* (2019.01)
*G06N 20/10* (2019.01)

(52) U.S. Cl.
CPC ......... *G06F 16/2365* (2019.01); *G06N 20/00* (2019.01); *G06N 20/10* (2019.01); *G06N 5/047* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 2011/0289025 | A1* | 11/2011 | Yan | G06N 5/025 706/12 |
| 2013/0313991 | A1* | 11/2013 | Pan | H05B 45/395 315/201 |
| 2014/0214801 | A1* | 7/2014 | Ciliberti, III | G06F 16/284 707/722 |
| 2015/0089309 | A1* | 3/2015 | Fu | G06F 11/0724 714/57 |
| 2015/0148919 | A1 | 5/2015 | Watson | |
| 2015/0160098 | A1* | 6/2015 | Noda | G05B 23/024 702/35 |
| 2015/0279129 | A1* | 10/2015 | Ishikawa | B60K 35/00 701/29.1 |
| 2016/0217379 | A1* | 7/2016 | Patri | G06N 20/00 |
| 2016/0342903 | A1 | 11/2016 | Shumpert | |

OTHER PUBLICATIONS

Notice of Allowance received for U.S. Appl. No. 15/617,860 dated Dec. 14, 2020, 37 pages.

* cited by examiner

302 — GROUPING, BY A SYSTEM OPERATIVELY COUPLED TO A PROCESSOR, TRAINING DATA OF A SET OF EQUIPMENT FAILURE DATA INTO ONE OR MORE FAILURE TYPE GROUPS BASED ON ONE OR MORE DETERMINED FAILURE CRITERIA, WHEREIN THE ONE OR MORE FAILURE TYPE GROUPS REPRESENT EQUIPMENT FAILURE CLASSIFICATIONS ASSOCIATED WITH ENERGY EXPLORATION PROCESSES.

304 — SELECTING, BY THE SYSTEM, FIRST UNGROUPED DATA FROM THE SET OF EQUIPMENT FAILURE DATA BASED ON A LEVEL OF SIMILARITY BETWEEN THE FIRST UNGROUPED DATA AND THE TRAINING DATA.

FIG. 3

FACILITATING CLASSIFICATION OF EQUIPMENT FAILURE DATA

BACKGROUND

In oil and gas exploitation, sucker-rod pumping systems are used in approximately 90 percent of artificially lifted wells. However, there are more than ten types of failures to be detected from a running pumping well. One or more embodiments of the present invention relates to employing grouping components to group oil and gas exploration equipment failure data into one or more failure type groups and facilitate identification of equipment failure types.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ grouping components to group oil and gas exploration equipment failure data into one or more failure type groups and facilitate identification of equipment failure types.

According to an embodiment, a system is provided. The system comprises a processor that executes computer executable components stored in memory. The computer executable components comprise a first grouping component that groups first equipment failure data of a set of equipment failure data into a first failure type group based on determined failure criterion. Further, the computer executable components comprise a selection component that selects second equipment failure data from the set of equipment failure data based on a level of similarity between the first equipment failure data and the second equipment failure data. In another aspect, the computer executable component can comprise an evaluation component that evaluates the level of similarity between the first equipment failure data and the second equipment failure data based on similarity criterion comprising equipment performance similarities or similarities in energy extraction performance.

According to another embodiment, a computer-implemented method is provided. The computer-implemented method can comprise grouping, by a system operatively coupled to a processor, training data of a set of equipment failure data into one or more failure type groups based on one or more determined failure criteria, wherein the one or more failure type groups represent equipment failure classifications associated with energy exploration processes. The computer-implemented method can also comprise selecting, by the system, first ungrouped data from the set of equipment failure data based on a level of similarity between the first ungrouped data and the training data. In an aspect, the computer-implemented method can also comprise classifying, by the system, second ungrouped data, first grouped data, or grouped training data into the one or more failure type groups based on a k-nearest neighbor algorithm.

According to yet another embodiment, a computer program product for facilitating a grouping of energy exploration equipment data into one or more failure type group is provided. The computer program product can comprise a computer readable storage medium having program instructions embodied therewith, the program instructions executable by a processor to cause the processor to group a set of expert consensus data representing energy exploration equipment failures into one or more failure type groups. The computer program product can also cause the processor to select a first set of uncategorized failure data within the one or more failure type groups based on a similarity level between the set of expert consensus data and the first set of uncategorized failure data. In another aspect, the computer program product can cause the processor to group the first set of uncategorized failure data within the one or more failure type groups based on the similarity level with the set of expert consensus data.

BRIEF DESCRIPTION OF THE DRAWINGS

FIG. 1D illustrates a diagram of example, non-limiting grouped equipment failure data samples represented by one or more data curves plotted within a graph in accordance with one or more embodiments described herein.

FIG. 3 illustrates a flow diagram of an example, non-limiting computer-implemented method that can facilitate a grouping of training equipment failure data into one or more equipment failure type groups based on one or more determined failure criteria and selecting ungrouped data for grouping into the one or more failure type groups based on a level of similarity between the ungrouped data and the grouped training data in accordance with one or more embodiments described herein.

DETAILED DESCRIPTION

Figure 1A:
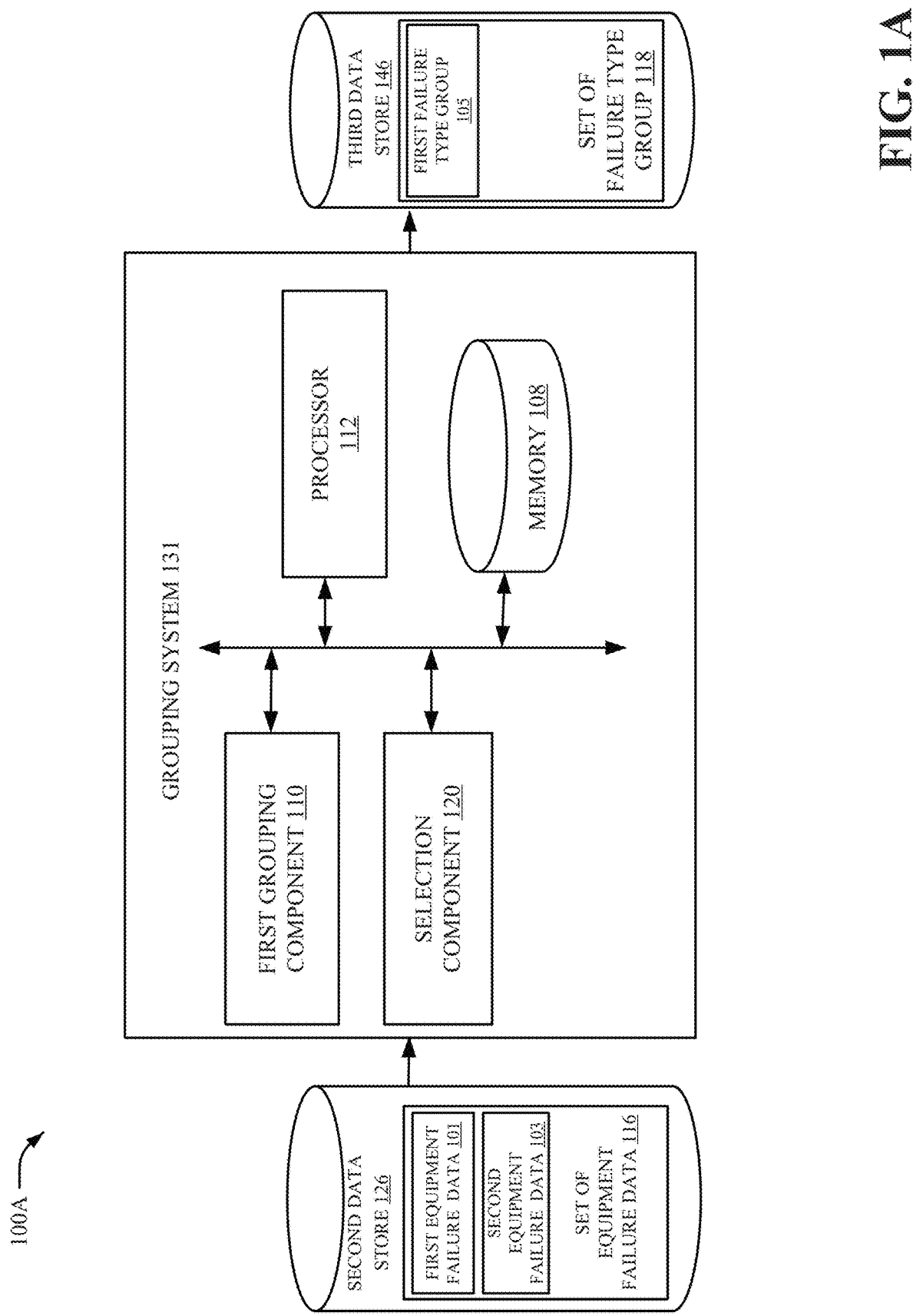
FIG. 1A illustrates a block diagram of an example, non-limiting system that can facilitate a grouping of equipment failure data into one or more equipment failure type groups in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting system 100 that can facilitate a grouping of equipment failure data into one or more equipment failure type groups in accordance with one or more embodiments described herein. In an aspect, system 100 can comprise or otherwise access (via a network or via storage at the system 100) second data store 126, third data store 146, a set of equipment failure data 116, set of failure type group 118, first equipment failure data 101, second equipment failure data 103, first failure type group 105, and grouping system 131. In one or more embodiments, grouping system 131 can include first grouping component 110, selection component 120, processor 112, and memory 108. In an aspect, processor 112 can execute the computer executable components and/or computer instructions stored in memory 108. In an aspect, one or more of the components of system 100 can be electrically and/or communicatively coupled to one or more devices of system 100 or other embodiments to perform one or more functions described herein.

In an aspect, first grouping component 110 can group the first equipment failure data 101 of a set of equipment failure data 116 into a first failure type group 105 based on determined failure criterion as described below. In an aspect, first equipment failure data 101 can represent information associated with a broad range of equipment failures including oil and gas exploration equipment failures. For instance, many oil and gas exploration techniques utilize liquid and gas extraction equipment comprising mechanical components to facilitate the extraction of oil and gas from one or more wells. In various instances, an artificial lift technique in connection with a sucker-rod pump equipment can be utilized to pump oil and gas from wells. In an aspect, sucker-rod pump equipment performs rigorous pumping operations that can render the equipment components vulnerable to breakdown or failure. For instance, a sucker-rod pumping assembly can utilize steel rods to facilitate pumping operations, however, the steel rods used to load oil and gas into a tube are subject to corrosion, mishandling damage (e.g., nicks, dings), stress fractures from tension imposed on the rods, and other such equipment failure types.

The occurrence of equipment failures can be classified, labeled, and/or grouped (e.g., using grouping component 110) within one or more failure type groups (e.g., failure type group 118). In an aspect, one or more failure type groups can include, but is not limited to, a gas interference (GI) failure, a fluid shortage (FS) failure, a piston stuck (PS) failure, a standing valve leakage (SVL) failure, a traveling valve leakage (TVL) failure, an oil tube leakage (OTL) failure, a down-stroke pump bumping (DPB) failure, a sand production (SP) failure, gas lock (GL) failure or other such sucker-rod pumping related failure. In another aspect, data not indicative of an equipment failure (e.g., data representing normal equipment operations) can be grouped (e.g., using grouping component 110) in a first group (e.g., the first group can be considered and/or referred to herein as a "normal" group) and data that is incomplete, unidentifiable, not a failure, or not normal can be grouped in a second group (e.g., the second group can be considered and/or referred to herein as an "invalid" group). For instance, first grouping component 110 can group data that does not pertain to an equipment failure event into an invalid group.

In an aspect, first grouping component 110 can group the first equipment failure data 101 of the set of equipment failure data 116 into one or more failure type groups of a set of failure type groups (e.g., set of failure type group 118). In an aspect, the set of failure type group 118 can include a GI failure group, FS failure group, PS failure group, SVL failure group, TVL failure group, OTL failure group, DPB failure group, SP failure group, GL failure group, normal group or invalid group. Furthermore, in an aspect, first equipment failure data 101 along with the set of equipment failure data 116 can be stored in a second data store 126. As such, first grouping component 110 can utilize first equipment failure data 101 of the set of equipment failure data 116 located at second data store 126 for grouping into failure type groups. Furthermore, in an aspect, first equipment failure data 101 can be comprised of typical sample data belonging to a failure type group.

In another aspect, first grouping component 110 can group a subset of data (e.g., first equipment failure data 101) based on one or more determined failure criterion that represent computer-readable instructions, requirements and/or policies representative of one or more domain expert user input. For instance, information indicating criterion can be received from one or more devices (not shown) that can be associated with one or more experts in oil and/or gas. For example, in some embodiments, one or more engineers, researchers, and other such oil and gas exploration technology experts (e.g., domain expert users) can review the set of equipment failure data 116 and input criterion (e.g., by implementing instructions, policies, suggested data, requirements) for grouping an initial subset of equipment failure data (e.g., first equipment failure data 101) representative and unambiguously indicative of data corresponding to one or more equipment failure type groups of the set of failure type group 118. In some embodiments, criterion can be generated and/or determined by one or more components of system 100 based on artificial intelligence rules, processing of one or more electronic policies or the like.

Furthermore, in an aspect, one or more devices (not shown) and/or one or more experts can provide domain expert user input that can provide criterion for grouping (e.g., using first grouping component 110) data in one or more formats (e.g., raw data formats, graphical representations of data, equipment performance metric data, historical data, predictive data, etc.) of the set of equipment failure data 116. As an example, a device can determine the format and/or type of information employed by one or more other components for processing, grouping or the like and can generate criterion for data formats. As another example, one or more devices and/or one or more technology expert users specialized in assessing oil and gas equipment failures can process, evaluate and/or label equipment failure data subsets and input the criteria used to label such equipment failure data subsets. In an aspect, the labeled equipment failure data can be received by first grouping component 110 and utilized (e.g., by first grouping component) as training data by which to compare subsequent subsets of ungrouped data.

Also, in one or more aspect, the criterion for grouping can include, but is not limited to, data comparison criterion (e.g., criterion to compare known equipment failure across more than one equipment unit and more than one failure type group), equipment focused criterion (e.g., equipment component information such as design specifications, component measurements, material composition of parts, maintenance schedules, and other such equipment based information), expert judgment (e.g., providing opinions based on data trend evaluations), and other such criterion. For instance, the criterion can include shape requirements of graphic representations (e.g., data curves) for grouping (e.g., using grouping component 110) data subsets into one or more failure type groups.

Accordingly, in some embodiments, processor 112 can execute grouping tasks (e.g., using first grouping component 110) that bundle subsets of data into an initial set of training data (e.g., first equipment failure data 101) based on the one or more criterion described herein. In an aspect, first grouping component 110 can group such first equipment failure data 101 into one or more failure type groups of a set of failure type group 118 based on the one or more criterion. In another aspect, first equipment failure data 101 can represent training data by which subsets of equipment failure data of the set of equipment failure data 116 can be compared for grouping (e.g., using first grouping component 110) within one or more failure type group. In another aspect, selection component 120 can select the second equipment failure data 103 from the set of equipment failure data 116 based on a level of similarity between first equipment failure data 101 and second equipment failure data 103. For instance, selection component 120 can select a subset of ungrouped equipment failure data represented as a data curve from the set of equipment failure data 116 having a similar shape to a data curve of training data (e.g., first equipment failure data 101) within a first failure type group 105.

Thus, selection component 120 can select ungrouped subsets of equipment failure data from the set of equipment failure data 116 (e.g., stored at second data store 126) for purposes of grouping (e.g., using first grouping component 110) based on a comparison of a level of similarity between the second equipment failure data 103 and the training data (e.g., the first equipment failure data 101). In an aspect, a level of similarity between first equipment failure data 101 and second equipment failure data 103 can be determined based on a comparison of data patterns and data signatures associated with an equipment failure type (e.g., first failure type group 105). In an aspect, selection component 120 may select ungrouped equipment failure data (e.g., second equipment failure data 103) based on a comparison of key features between a subset of equipment failure data of the set of equipment failure data 116 and first equipment failure data 101. For instance, a key feature can include, but is not limited to, the slope or shape of a data curve, a statistical metric associated with a group of data points, a comparison of data models associated with target metrics, and/or other such features of data.

Furthermore, in an aspect, the data associated with sucker-rod equipment can represent information relevant to a determination of or correlation to equipment failure. For instance, the data can represent equipment operational performance information (e.g., oil and gas production amounts, volume of oil and gas well reservoir drawdown, average quantity of fluid lifted to the surface of the well, gaseous fluid level measurements within the well, and other such performance information), equipment maintenance information (e.g., equipment calibration information, equipment upkeep information, identified equipment deterioration items such as corrosion, and other such maintenance information), and equipment specification information (e.g., size, shape, model number, and/or material composition) of one or more sucker-rod pumping assemblies.

Figure 1B:
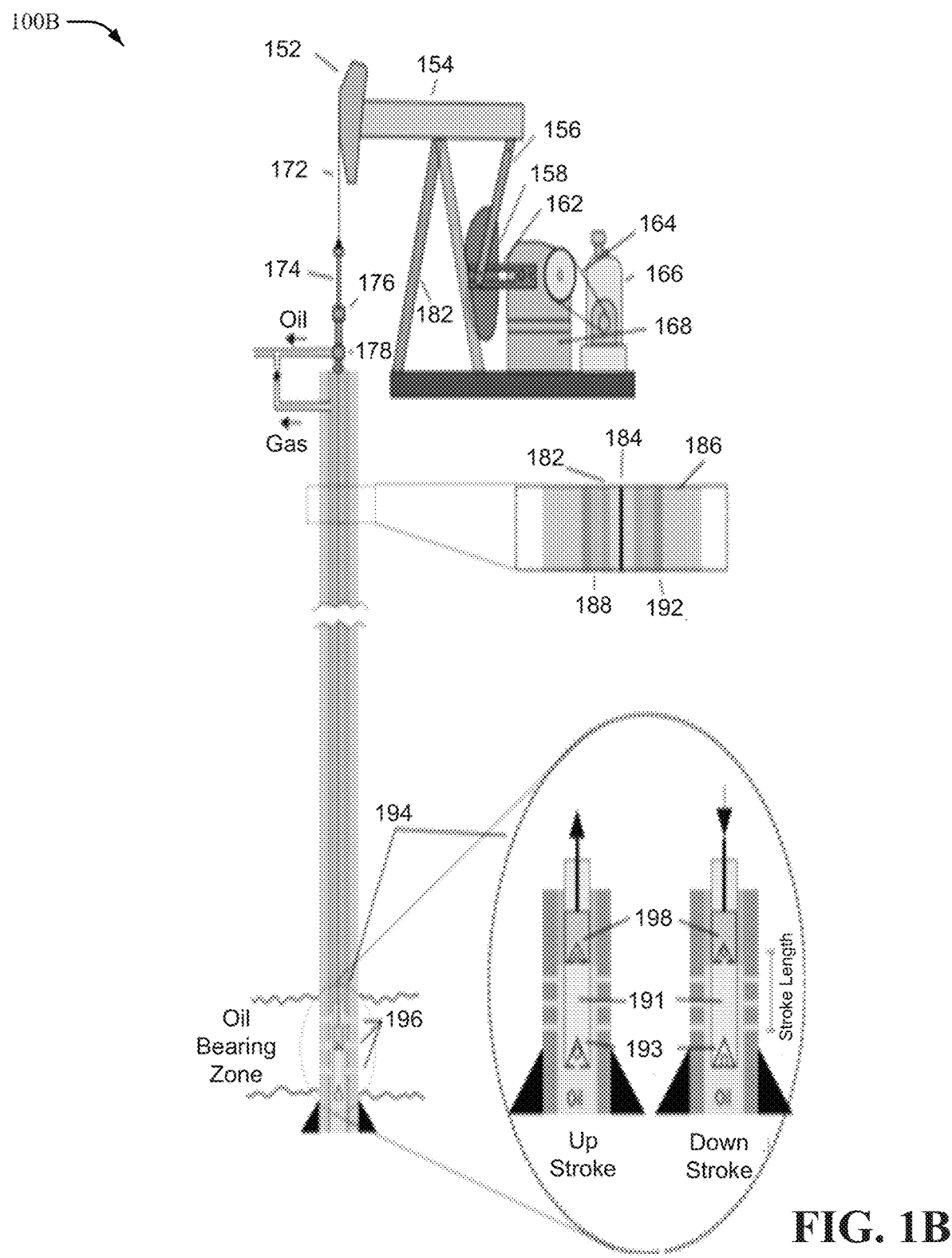
FIG. 1B illustrates a diagram of an example, non-limiting oil and gas exploration equipment in accordance with one or more embodiments described herein.

At FIG. 1B, illustrated is a diagram of example, non-limiting oil and gas exploration equipment in accordance with one or more embodiments described herein. Repetitive description of like elements employed in other embodiments described herein is omitted for sake of brevity.

Also illustrated is a non-limiting example of assembly 100B representing a sucker-rod assembly and associated equipment components capable of performing oil and gas exploration operational activities. In an aspect, assembly 100B can comprise several mechanical components, which may be vulnerable to failure in various instances for one or more reasons such as design issues, mechanical component degradation from general operations, manufacturing defects and/or external environmental factors. For instance, in an aspect, components of assembly 100B can be made from steel which is vulnerable to corrosion from vehement weather (e.g., environmental factors), denting and deterioration (e.g., from friction and/or forceful impact imposed on component parts during operational activities), and/or inoperability due to faulty production issues of various component parts during manufacturing.

Furthermore, in an aspect, assembly 100B can be vulnerable to wear and tear from chemicals that contact equipment components of assembly 100B during the oil and gas extraction process. For instance, steel parts of assembly 100B that perform pumping operations underground in an oil well may be exposed to acid producing bacteria (e.g., bacteria that excrete acids) or sulfate reducing bacteria (e.g., bacteria that generate hydrogen sulfate) that rapidly corrode steel. Furthermore, in an aspect, the byproducts of corroded steel further inhibit the ability of applied corrosion treatment chemicals to effectively penetrate the steel components of assembly 100B and kill acid producing bacteria. Accordingly, assembly 100B comprises component parts that are subject to failing due to one or more equipment vulnerabilities and such equipment failures can be grouped or classified into one or more equipment failure types.

In an aspect, assembly 100B can comprise various equipment components and mechanical parts including curved box component 152, walking beam component 154, pitman arm component 156, counter weight component 158, crank component 162, v-belt component 164, prime mover component 166, gear reducer component 168, bridle component 172, polished rod component 174, stuffing box component 176, tee component 178, tubing component 182, sucker rod component 184, cement component 186, annulus component 188, casing component 192, down hole pump component 194, perforation component 196, traveling valve component 198, pump barrel component 191, and standing valve component 193.

In an aspect, the mechanical parts that comprise assembly 100B are utilized to facilitate the pumping and extraction of oil and gas from oil and gas wells. Furthermore, any of the intricate equipment component parts can fail for one or more reasons and such failures can be classified in one or more failure groups referenced above. Accordingly, system 100 and other such system embodiments disclosed herein can employ processor 112 to execute the first grouping component 110 to facilitate a grouping of data (e.g., grouping subsets of ungrouped data from the set of equipment failure data 116) into grouped data subsets corresponding to equipment failures (e.g., failures of assembly 100B equipment components) for storage within one or more equipment failure type groups (e.g., first failure type group 105) in third data store 146.

For instance, an oil and gas equipment failure that occurs from a gas interference problem can include a process by which the traveling valve component 198 opens too slowly. The result of the traveling valve component 198 opening too slowly can result in poor pump efficiency by assembly 100B thus causing gas to enter the subsurface of a sucker rod component 184. Accordingly, the set of equipment failure data 116 corresponding to the functioning of mechanical components of assembly 100B and/or identifying various failures that occur during the oil and gas exploration process can be stored in second data store 126. In an aspect, FIG. 1E illustrates a curve 104E that plots data associated with an equipment failure that occurred as a result of a gas-related influence on the equipment. For instance, in the event a pump cylinder is not filled when pumping oil, more gas ends up flowing into the pump barrel along with well fluid. At the beginning of the pumping, due to gas expansion, the pressure in the pump cylinder can not be reduced rapidly, resulting in a slow load increase, which consequently results in the fixed valve having a delayed opening. As a column of oil and well fluid continues upward within the pump cylinder, the fixed valve opens and the column of oil and well fluid is pumped into the pump and discharge well. In an aspect, during the beginning stages of the next stroke, the gas in the pump cylinder can be compressed, so that the pressure in the pump increases slowly and the moving valve is delayed to open which causes a slow unloading of the oil. As a rod continues to pump downward, the travelling valve opens and the fluid in the pump barrel is lifted to the upper part of the piston. This equipment failure can be identified in curve 104E by noting a missing arc at the lower right corner of curve 104E. Accordingly, such equipment failure data type can be identified and grouped properly based on the data curve shape in this instance.

In an aspect, first grouping component 110 groups the first equipment failure data 101 of a set of equipment failure data 116 into a first failure type group 105 (e.g., GI failure) based on determined failure criterion (e.g., an equipment component of assembly 100B that failed, assembly 100B performance data related to the failure, analysis of co-variables associated with a failure type, and other such criteria). In an aspect, a similarity comparison algorithm can be employed to compare equipment failure data. The similarity comparison algorithm can utilize curves representing equipment failure data as input data to be compared with other curves representing other equipment failure data. If the similarity comparison algorithm determines a similarity score between two curves that is higher than a threshold score, then the output can result in a grouping of the two curves within the same failure type group (e.g., the curves can be outputted if they are deemed to be similar).

In an aspect, first grouping component 110 can group the sample data (e.g., first equipment failure data 101) based on domain expert consensus information (e.g., domain expert input data representing requirements, policies, and instructions). For instance, processor 112 can execute the first grouping component 110 to group equipment failure data based on user inputs or assembly 100B domain expertise based instructions to determine one or more data points for constitution of a failure type group. In an aspect, grouping (e.g., using first grouping component 110) of initial data from the set of equipment failure data 116 based on domain expert user input can facilitate the generation of training data by which system 100 can employ one or more components to iteratively compare selected (e.g., using selection component 120) ungrouped data points from the set of equipment failure data 116 based on data similarity characteristics and determined levels of data similarity.

In an aspect, the set of failure type group 118 can include any one or more oil and gas exploration equipment (e.g., assembly 100B) or equipment component failure including GS, FS, PS, SVL, TVL, OTL, DPB, UPB, SP, and/or GL. Furthermore, in some instances, the data may indicate that no equipment failure occurred and such data can be included in a "normal" group. In another instance, data may not satisfy one or more determined criterion (e.g., pattern criteria, procedures, grouping policies, grouping requirements, etc.) and such data can be grouped into an "invalid" group. As an example, FIG. 1E illustrates a graph representation of equipment data belonging to a normal group (e.g., the equipment hasn't experienced failures) where the data plot 100E forms a parallelogram-resembling shape. In an aspect, curve 100E presents a data plot of equipment load data 185 plotted on the y-axis and equipment displacement data 187 plotted on the x-axis. Furthermore, in an aspect, the equipment data representing a normal group can be plotted such that there is a coherent shape formed by such normal group data plot. However, failure data belonging to an invalid group can be represented by plots that resemble a disorderly smattering of points or missing points (e.g., illustrated by invalid group 113 in FIG. D below which may be indicative of equipment failure data that is missing sensor data associated with the equipment). In an aspect, the data associated with oil and gas exploration equipment can represent information associated with the mechanical performance of assembly 100B components or operation metrics associated with the functioning of assembly 100B components.

Figure 1C:
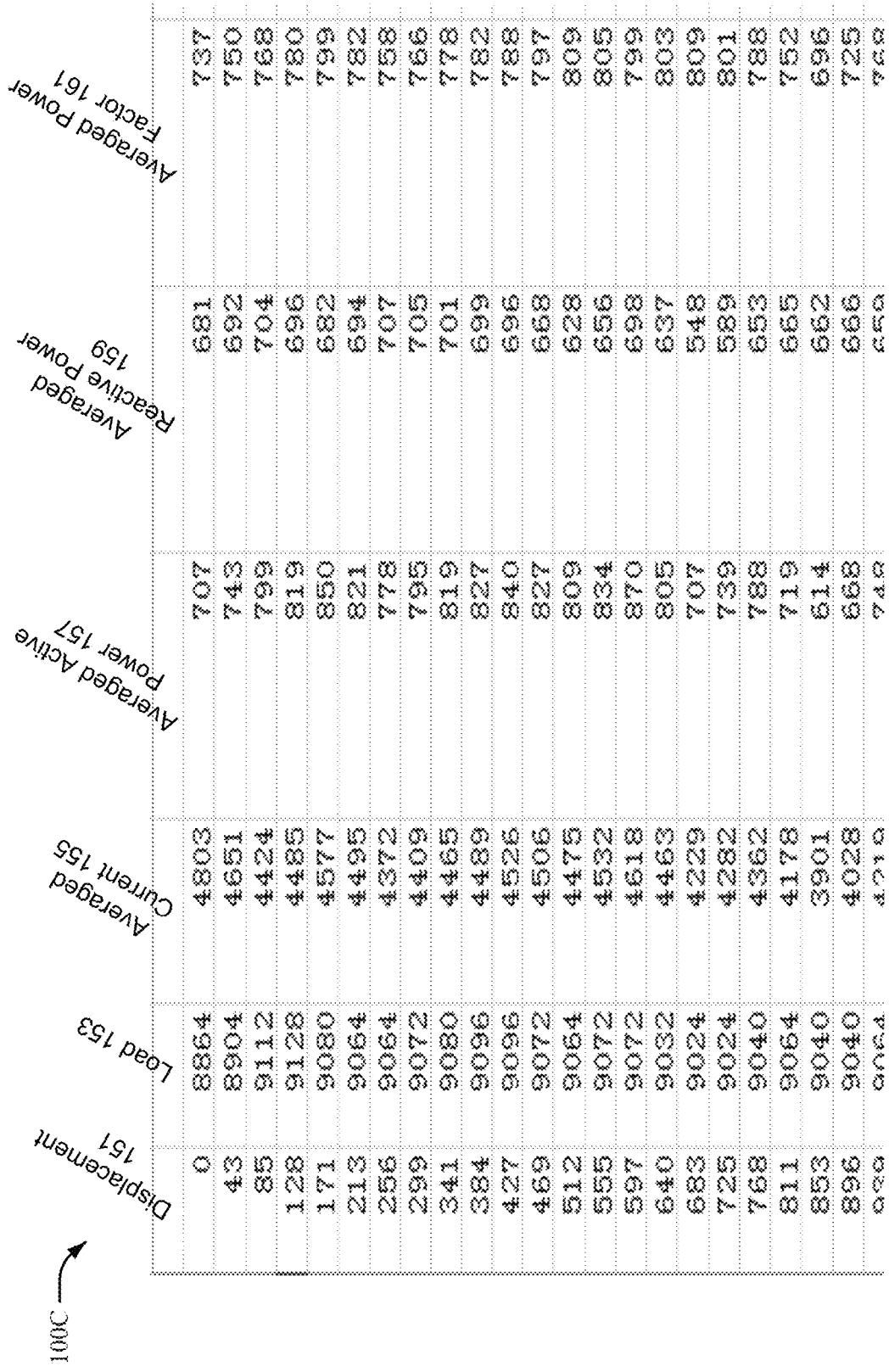
FIG. 1C illustrates sample equipment failure data representing oil and gas exploration equipment performance metrics and presented in a numerical format in accordance with one or more embodiments described herein.
Figure 1D:
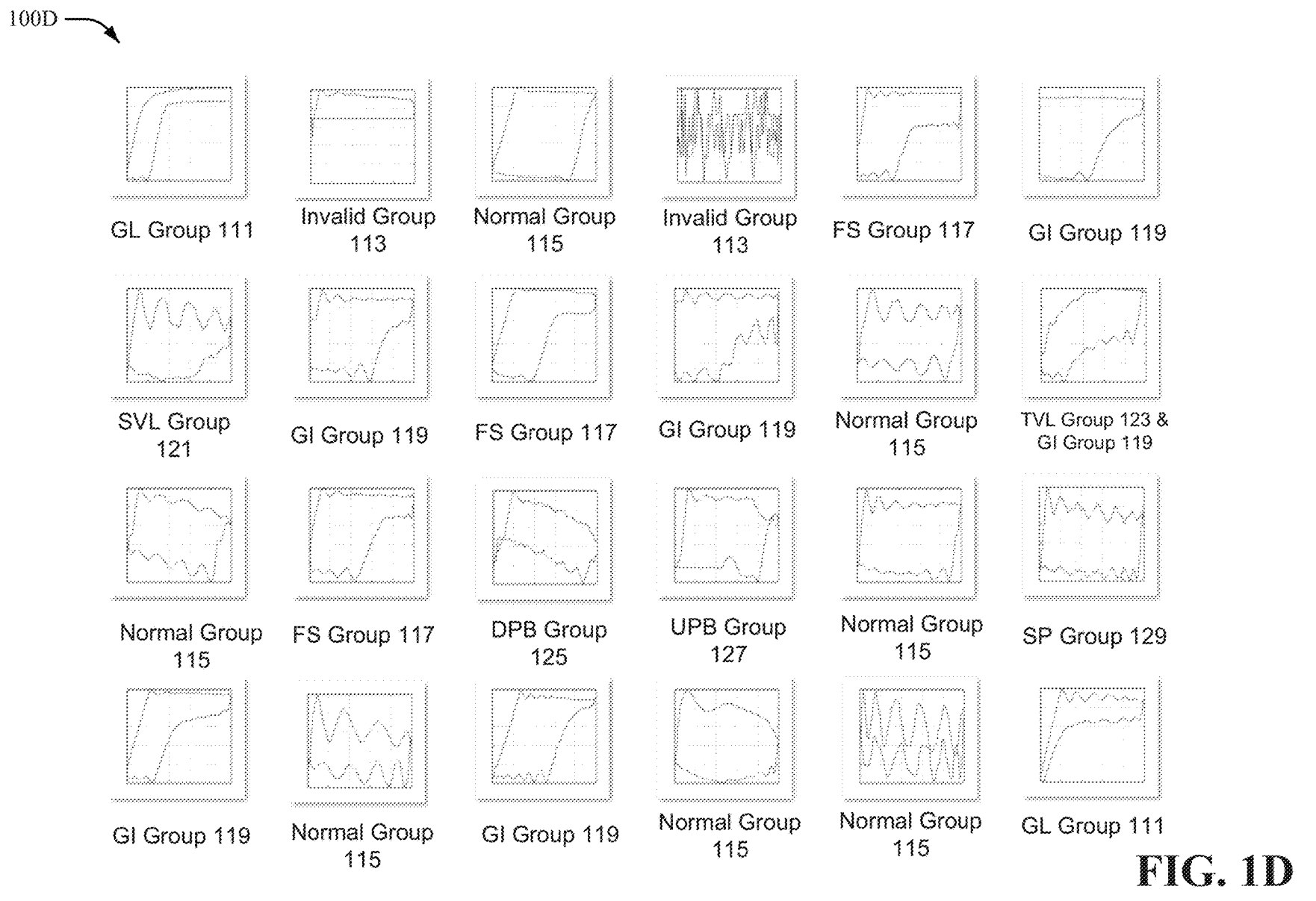
Figure 1E:
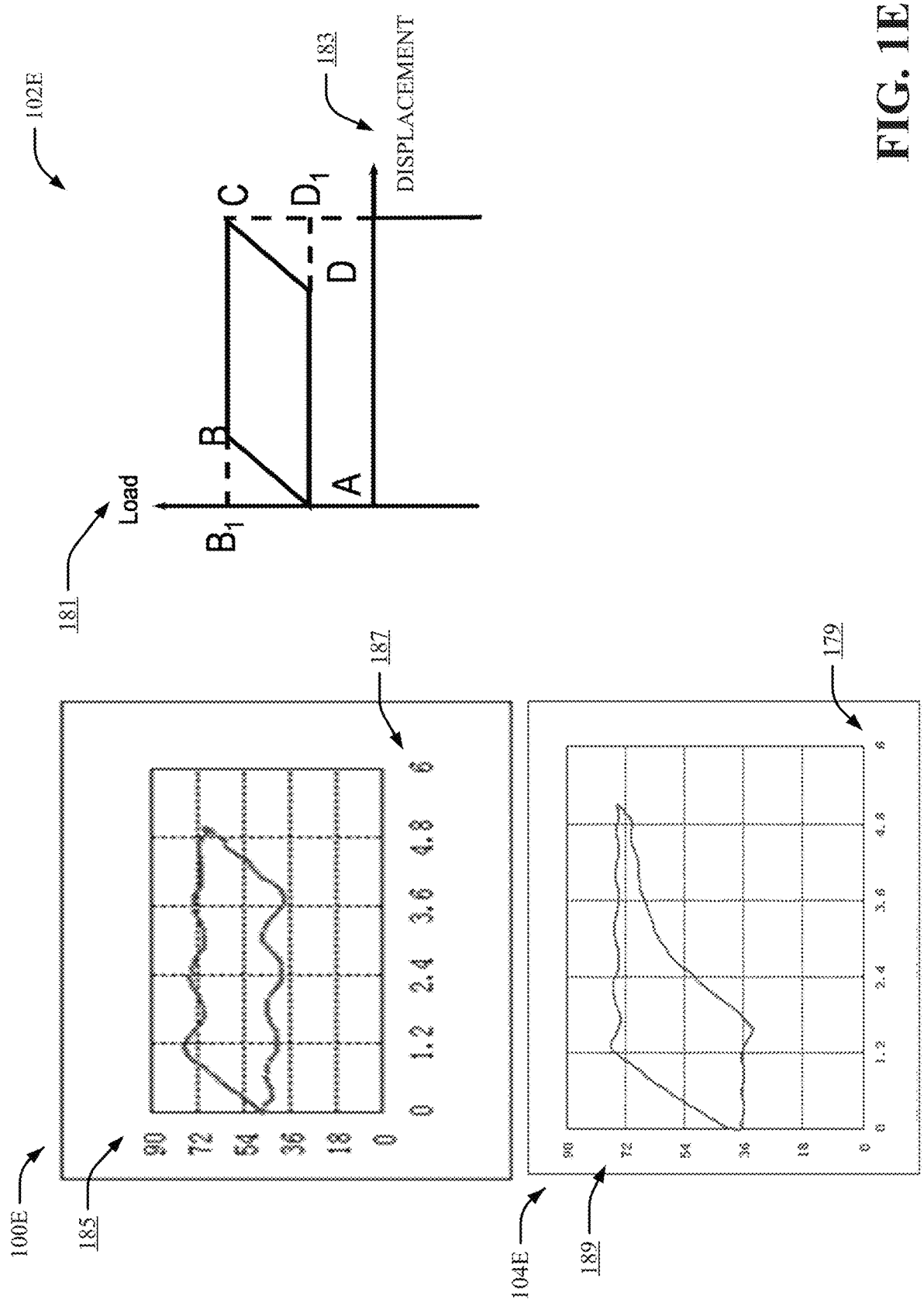
FIG. 1E illustrates example diagrams of curves representing load data and displacement data corresponding to oil and gas exploration equipment.

FIG. 1C illustrates sample equipment failure data 100C representing oil and gas exploration equipment performance metrics and presented in a numerical format in accordance with one or more embodiments described herein. Repetitive description of like elements employed in other embodiments described herein is omitted for sake of brevity.

In an aspect, sample equipment failure data 100C can be embodied within a series of rows and columns such that the columns represent various metrics associated with assembly 100B operability and the rows represent observational instances where data was documented during time intervals as pumping operations were conducted. In an aspect, sample equipment failure data 100C can include equipment operability and performance metric data such as displacement data 151, load data 153, average current data 155, average active power data 157, average reactive power data 159, and/or average power factor data 161. In an aspect, first equipment failure data 101 can include any of the equipment operability and performance metric data exemplified by sample equipment failure data 100C.

In an aspect, displacement data 151, also referred to as "pump displacement data" can be the volume of fluid (e.g., oil or gas) produced in one revolution (up and down motion) by sucker rod component 184. In an aspect, a revolution can include assembly 100B performing a down hole (e.g., a subsurface portion of an oil well) operation that includes a pump down-stroke (e.g., filling a pump chamber full of fluid) and a pump up-stroke (e.g., traveling valve component 198 opens to draw the fluid to the surface of the well). The displacement metric can indicate whether the equipment (e.g., assembly 100B) and/or equipment components are producing too much or too little fluid volume during each pump revolution.

Furthermore, in an aspect, the displacement metric can be determined based on other metrics such as a pump speed, unit stroke length, or a diameter of sucker rod component 184. For instance, assembly 100B can be designed to pump a target volume of oil and gas to the surface of an oil well. In an aspect, a sucker rod component 184 can be utilized with a target diameter design in order to achieve the target volume of oil and gas to be pumped from an oil well. Furthermore, assembly 100B can be calibrated and configured to employ the sucker rod component 184 at a target pump speed (e.g., measured in strokes per minute) in order to bear the stress of a fluid, the equipment's own weight, along with the weight of the fluid to accomplish the extraction of the target volume of oil and gas for extraction. If too much or too little oil and/or gas is being displaced during one or more pump revolutions based on the target displacement that assembly 100B was designed to displace, then a failure can be deemed to occur or not occur based on a review of the displacement data 151. In another aspect, displacement data in association with load data can be utilized to determine the occurrence of a failure with respect to oil and gas pumping well equipment. For instance, FIG. 1E illustrates a data plot 102E of load data 181 on the y-axis and displacement data 183 on the x-axis and the resultant shape of the plotted curve (e.g., a parallelogram indicating normal functioning of the equipment) can indicate the equipment failure type that has occurred or not occurred. In an aspect, the grouping of data can be associated with a variety of data types beyond oil and gas equipment failure types. Accordingly, the systems, methods, and several embodiments disclosed herein can apply to any figure-based data sets (e.g., data sets that can be plotted into a curve that provides information based on the curve shape).

In another aspect, load data 153 can refer to load information associated with sucker rod component 184 when pulling oil or gas upwards on the up stroke of the sucker rod component 184. In an aspect, load data 153 can include a load born by sucker rod component 184 and analysis in load data 153 can indicate whether the sucker rod component 184 is overloaded or under-loaded in its capacity to facilitate the flow of oil and/or gas to the surface of a well. In an aspect, a consideration of load data 153 in grouping tasks (using grouping component 110) and selection tasks (e.g., using selection component 120) can also facilitate a determination of an occurrence or non-occurrence of a failure to the sucker rod component 184 of assembly 100B.

In another aspect, average current data 155 can represent metrics quantifying stray or induced electrical currents that flow to or from a sucker rod component 184 (or rod string). In an aspect, stray current corrosion can be caused by grounding electrical equipment of assembly 100B to the head of a well. In an aspect, a consideration (e.g., by grouping component 110 and/or selection component 120) of average current data 155 can indicate the levels of electrical current emitted from or absorbed by sucker rod component 184. In an aspect, average current data 155 alone or in combination with other data subsets can indicate a failure type occurrence or non-occurrence associated with equipment components of assembly 100B. For example, average current data 155 in combination with load data 153 and displacement data 151 can convey information as to whether there may be an irregular shape (e.g., pitted edges, cones in the pit of sucker rod component 184 base, smooth edges where it is typically unsmooth, etc.) forming on the inside or outside of sucker rod component 184. Accordingly, such irregular shape (e.g., caused by current) can effect the operability of the equipment and indicate whether an equipment failure type exists.

In another aspect, another type of data can include average active power data 157 that can represent input voltage and current of a motor (not illustrated in FIG. 1B) that supplies power to a gear reducer component 168. In an aspect, gear reducer component 168 can reduce angular velocity and increase torque of a pumping mechanism associated with assembly 100B to optimize oil and/or gas extraction efficiencies. In an aspect, average active power data 157 can indicate whether there is a failure type associated with power signal transmission to any of the equipment of assembly 100B. For instance, a consideration of average active power data 157 for grouping (e.g., using grouping component 110) and/or selection tasks (e.g., selection component 120) can indicate an occurrence or non-occurrence of an insufficient supply of power being supplied by a motor to equipment components of assembly 100B. Furthermore, in an aspect, the presence of an insufficient power supply may indicate that there is a failure in the transmission of mechanical power applied to sucker rod component 184 somewhere along the length (e.g., between the well surface and the well base) of the sucker rod component 184. In an aspect, average active power data 157 alone or in combination with other data sets (e.g., load data 153) can facilitate a grouping decision of a subset of data within an equipment failure type related to power issues.

In yet another aspect, another type of sample equipment failure data 100C can include average reactive power data 159 that can represent the effective power required to lift fluid to the surface of a well. While average active power data 157 can indicate the input power transmitted from the motor (not illustrated in FIG. 1B) to the sucker rod component 184, the average active power data 157 can indicate the power consumed by sucker rod component 184 during the upstroke process (e.g., when the rod begins to draw fluid up from the well rather than stroking downward to create a suction) of sucker rod component 184. In an aspect, the average reactive power data 159 can depict the work of assembly 100B to lift the liquid (e.g., oil) from the well bottom to the surface of the well. The average reactive power data 159 can be an indicator of the effectiveness of the lifting process of assembly 100B based on one or more factors such as the depth of a well and/or the volume of the liquid produced by the lifting process.

In an aspect, average reactive power data 159 can reflect analysis related to the balance of the pumping unit (e.g., sucker rod component 184) of assembly 100B, a density and water content composition of the oil drawn upwards, and/or stroke length of sucker rod component 184. In an aspect, the average reactive power data 159 alone or in combination with other data sets (e.g., average active power data 157) can facilitate a grouping determination (e.g., using grouping component 110) of an equipment failure type related to power issues of assembly 100B. For example, an undersupply of average reactive power data 159 can indicate a loss of energy supplied to equipment components such as the sucker rod component 184 or a fluid column (not illustrated in FIG. 1B) of assembly 100B. Furthermore, in an aspect, such data analysis can raise suspicions that assembly 100B may have issues related to pump friction, hydraulic pressure losses as well as fluid leakage. Also, in an aspect, an undersupply of average reactive power data 159 may be coupled with an oversupply of average active power data 157 thus indicating that assembly 100B is attempting to makeup for the loss in reactive data by overcompensating (e.g., as represented by the average active power data 157) in the mechanical work performed by a pumping unit of assembly 100B. Thus, in an aspect, a consideration (e.g., by grouping component 110 and/or selection component 120) of average reactive power data 159 and average active power data 157 can facilitate a determination of an occurrence of a failure type.

In an aspect, another type of sample equipment failure data 100C can include average power factor data 161 that can represent the amount of line current drawn by a motor (not illustrated in FIG. 1B) of assembly 100B. In an aspect, average power factor data 161 can indicate losses in power supplied by a motor of assembly 100B. In another aspect, average power factor data 161 that represents a power factor lower than a target threshold power factor can indicate that a motor (not illustrated in FIG. 1B) of assembly 100B may be operating inefficiently. In an aspect, an average power factor data 161 that has a lower value can indicate that a motor may be relatively oversized as compared to the appropriate sized motor required by assembly 100B to operate efficiently. Furthermore, average power factor data 161 can act as indicia for first grouping component 110 to group such data alone or in combination with other data (e.g., average active power data 157 or average reactive power data 159) into a failure type group. In another aspect, an average power factor data 161 that is lower than a target threshold may indicate that assembly 100B may need to utilize capacitors to increase the power factors.

Turning now to FIG. 1D, illustrated is a diagram of example, non-limiting grouped equipment failure data samples represented by one or more graph 100D in accordance with one or more embodiments described herein. Repetitive description of like elements employed in other embodiments described herein is omitted for sake of brevity.

In an aspect, the one or more graph 100D can also be referred to as a dynamometer card, where one or more graph 100D displays a graphic depiction of various data subsets. For instance, a surface card can display a load on a polished rod component 174 over a pump cycle (e.g., up and down revolution of a sucker rod component 184). The shape of one or more graph 100D is a function of several elements of assembly 100B including the pump depth (e.g., depth of the well), design of the sucker rod component 184 or rod string (not illustrated in FIG. 1B), and/or fluid load (e.g., represented by load data 153). In another instance, a pump card can display a fluid load on a pump plunger (not illustrated in FIG. 1B) over a pump cycle. In an aspect, the size and shape of the graph can indicate the operating conditions and performance of the pump including whether a failure exists, a failure is absent, or whether the data is invalid.

In an aspect, an ideal shape, such as the shape of normal group 115, can indicate that the assembly 100B is efficiently operating to allow for 100% liquid fillage within a pump of assembly 100B and that the pump of assembly 100B is in good condition. In another aspect, other shapes can indicate an occurrence of various failure types associated with assembly 100B such as an assembly 100B that is unanchored (e.g., illustrated by a slanted graph) or an occurrence of a sudden impact load (e.g., illustrated a steep drop in a graph line) to assembly 100B where potential damage to pump rods, tubing or a gearbox (e.g., not illustrated in FIG. 1B) of assembly 100B may occur. In another aspect, other graphic depictions of data can indicate the presence of a gas interference failure type with assembly 100B, issues with hydrostatic pressure within the pump, or a worn out pump. Accordingly, the shape of one or more graph 100D can indicate a failure type and first grouping component 110 can group first equipment failure data (including numerical data formats and graphic representations of data) into one or more failure type group. In an aspect, one or more graph 100D can include failure type groups comprising GL group 111, invalid group 113, normal group 115, GI group 119, SVL group 121, FS group 117, TVL group 123, DPB group 125, UPB group 127, and/or SP group 129. Also, although not illustrated in FIG. 1D, graphic depictions of other data can be grouped (e.g., using first grouping component 110) such as within an OTL group and/or a PS group.

Figure 2:
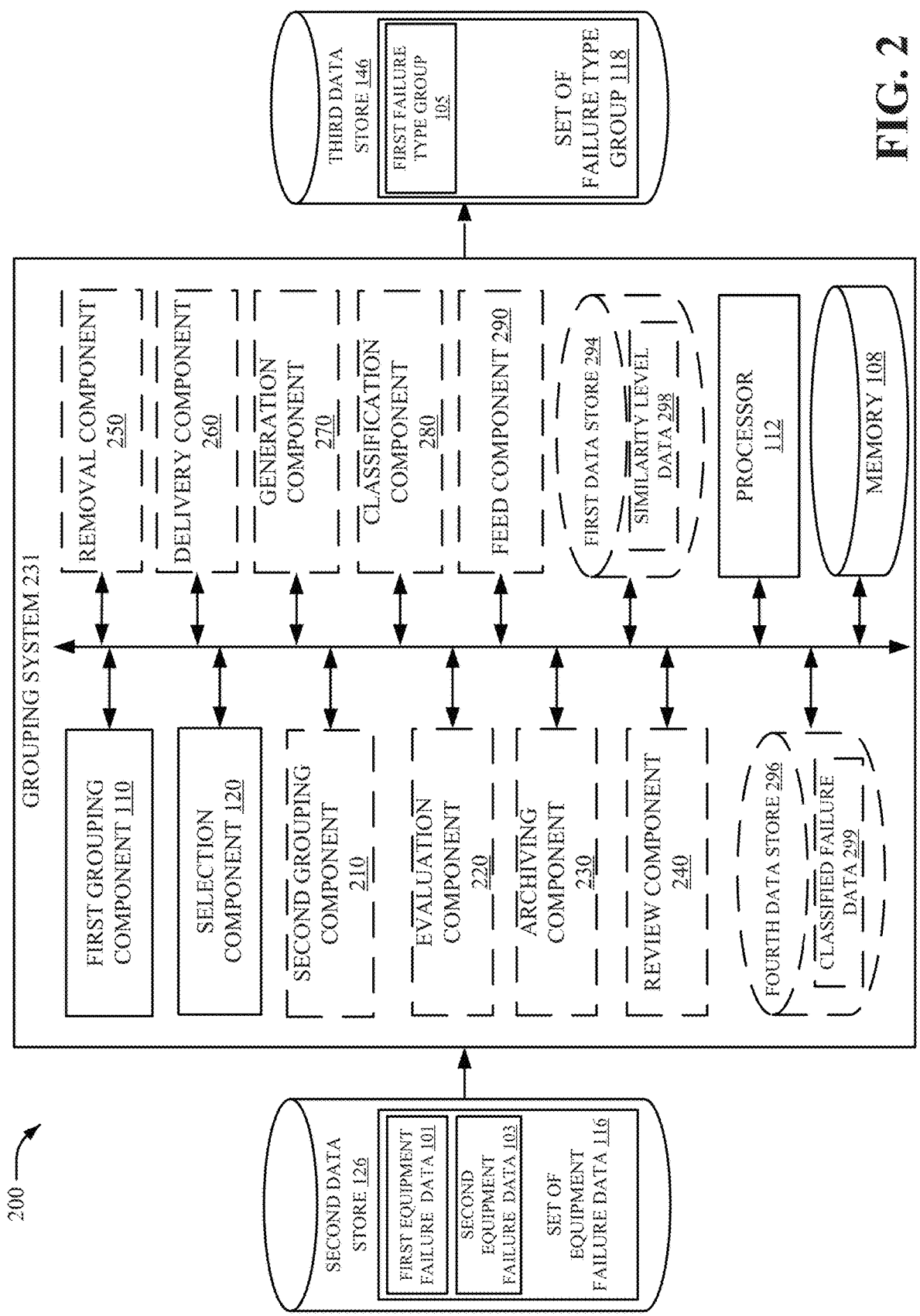
FIG. 2 illustrates a block diagram of an example, non-limiting system that can facilitate a grouping of equipment failure data into one or more equipment failure type groups based on a determined similarity level between ungrouped data and grouped data or a classification algorithm in accordance with one or more embodiments described herein.

Turning now to FIG. 2, illustrated is a block diagram of an example, non-limiting system 200 that can facilitate a grouping of equipment failure data into one or more equipment failure type groups based on a determined similarity level between ungrouped data and grouped data or a classification algorithm in accordance with one or more embodiments described herein. Repetitive description of like elements employed in other embodiments described herein is omitted for sake of brevity.

In an aspect, system 200 can include or otherwise be associated with one or more processor 112 that can execute the computer executable components and/or computer instructions stored in memory 108. In an aspect, system 200 can comprise second data store 126, third data store 146, a set of equipment failure data 116, failure type group 118, first equipment failure data 101, second equipment failure data 103, first failure type group 105.

In another aspect, non-limiting system 200 can comprise grouping system 231 that can include first grouping component 110, selection component 120, processor 112, memory 108, second grouping component 210, evaluation component 220, archiving component 230, review component 240, removal component 250, delivery component 260, generation component 270, classification component 280, feed component 290, first data store 294, fourth data store 296, similarity level data 298, and/or classified failure data 299. In an aspect, one or more of the components of system 200 can be electrically and/or communicatively coupled to one or more devices of system 200 or other embodiments disclosed herein.

In an aspect, system 200 can employ processor 112 to execute the first grouping component 110 that groups the first equipment failure data 101 of a set of equipment failure data 116 into a first failure type group 105 based on determined failure criterion. In another aspect, system 200 can also employ processor 112 to execute the selection component 120 to select second equipment failure data 103 from the set of equipment failure data 116 based on a level of similarity between the first equipment failure data 101 and the second equipment failure data 103. In another aspect, system 200 can employ processor 112 to execute the second grouping component 210 to group the second equipment failure data 103 into the first failure type group 105 based on a level of similarity between second equipment failure data 103 and first equipment failure data 101. In an aspect, a comparison of similarity between the first equipment failure data 101 and second equipment failure data 103 can by interpolating both data sets using a data displacement technique. For instance, first equipment failure data 101 can comprise fifty data points and second equipment failure data 103 can comprise fifty data points such that in aggregate one hundred data points or available for interpolations. Accordingly, in an aspect, the two sets of data can be interpolated by plotting the data points on the same graph, such that fifty data points are plotted as an up-side curve and fifty data points are plotted as a lower-side curve. Furthermore, in an aspect, two adjacent points can have a fixed displacement interval and the aggregate one hundred data points can be represented as a vector. As such, any two vectors (e.g., curves represented by several data points) can be compared to determine a similarity between such curves for grouping purposes.

In an aspect, processor 112 of grouping system 231 can execute first grouping component 110 to group the first equipment failure data 101 of the set of equipment failure data 116 based on domain expert user determined criteria. In an aspect, the resultant first equipment failure data 101 represents training data by which other data sets can be compared. As such, in an aspect, second grouping component 210 can group the second equipment failure data 103 of the set of equipment failure data 116 into the first failure type group 105 based on a similarity between second equipment failure data 103 (e.g., including ungrouped data sourced from second data store 126) and first equipment failure data 101 (e.g., training data grouped by first grouping component 110 based on domain expert user determined failure criteria).

In an aspect, the similarity between the first equipment failure data 101 and second equipment failure data 103 can be represented by similarity level data 298. As such, in an aspect, similarity level data 298 can represent a likelihood of similarity between two or more data points. For instance, in an aspect, similarity level data 298 can convey a greater similarity level (e.g., a metric or data value expressed as a higher number such as between seven and ten on a scale of one to ten for instance) and can indicate a higher likelihood that a data point or group of data points (e.g., second equipment failure data 103) from the set of equipment failure data 116 are similar to and belong in the same group as a data point or group of data points of the training data (e.g., first equipment failure data 101). Alternatively, similarity level data 298 representing a lower similarity level (e.g., a metric or data value expressed as a lower number such as between one and six on a scale of one to ten for instance) can indicate a lower likelihood that a data point or group of data points from the set of equipment failure data 116 are similar to the training data (e.g., first equipment failure data 101).

In an aspect, processor 112 can execute the second grouping component 210 to group data from the set of equipment failure data 116 based on similarity level data 298. Furthermore, in an aspect, processor 112 can execute the selection component 120 to select the grouped data subset (e.g., second equipment failure data 103) of the set of equipment failure data 116 for transmission (e.g., using delivery component 260 described below) to and storage within third data store 146 and archived at a storage location alongside an identified group of similar equipment failure data (e.g., first failure type group 105). As such, second equipment failure data 103 (e.g., a group of data grouped using second grouping component 210) comprises equipment failure data that satisfies a required level similarity (e.g., a similarity level threshold) to first equipment failure data 101 and can be grouped (e.g., using second grouping component 210) within the same failure type category (e.g., first failure type group 105) as first equipment failure data 101 based on the satisfaction of the similarity level.

In another aspect, system 200 can employ processor 112 to execute an evaluation component 220 that evaluates the level of similarity between the first equipment failure data 101 and the second equipment failure data 103 based on similarity criterion comprising equipment performance similarities or similarities in performance of oil and gas extraction activities. Thus, in an aspect, processor 112 can execute the evaluation component 220 to evaluate a similarity between training data (e.g., first equipment failure data 101) and a data subset (e.g., second equipment failure data 103) of the set of equipment failure data 116 represented as similarity level data 298 and stored at a first data store 294. In an aspect, similarity level data 298 is data that can comprise data from both first equipment failure data 101 and a subset of ungrouped data from the set of equipment failure data 116 having similar characteristics to first equipment failure data 101.

For instance, similarity level data 298 of one or more oil and gas exploration equipment (e.g., assembly 100B) can represent similarities in equipment operational performance (e.g., production efficiencies), equipment extraction performance (e.g., flow rate of fluids from well base to well surface), equipment power consumption levels (e.g., power drawn from motor components of equipment), failure information associated with one or more equipment components (e.g., shutdowns, irregularities in equipment functioning, or other such failures), graphical representations of failure data (e.g., shape comparisons of data curves or dynamometer card illustrations), historical equipment maintenance information, pump pressure levels during oil and gas production activities, and/or other such performance similarities. In another aspect, similarity level data 298 can comprise data from one or more oil and gas exploration equipment including displacement data 151, load data 153, average current data 155, average reactive power data 159, and/or average power factor data 161.

In an aspect, evaluation component 220 can evaluate a level of similarity between data subsets of the set of equipment failure data 116 based on a threshold similarity level. In an aspect, a threshold similarity level can be a required quantifiable metric or score assigned to an evaluation (e.g., using evaluation component 220) outcome from an evaluation of two subsets of data (e.g., first equipment failure data 101 and second equipment failure data 103). In an aspect, the threshold similarity level can be utilized by second grouping component 210 to facilitate a grouping of data from the set of equipment failure data 116. For instance, processor 112 can execute the second grouping component 210 to group together (e.g., into second equipment failure data 103) one or more equipment failure data points having a similarity level above seven (e.g., a threshold requirement for data to be deemed to have a greater likelihood of being similar to first equipment failure data 101) as part of first failure type group 105. The data points from the subset (e.g., second equipment failure data 103) of the set of equipment failure data 116 satisfying this threshold requirement can be stored at third data store 146 and archived with data corresponding to first failure type group 105.

Accordingly, processor 112 can also execute the second grouping component 210 to group one or more data points (e.g., second equipment failure data 103) deemed to satisfy an adjusted threshold similarity level requirement (e.g., satisfying a threshold similarity level value of nine for instance) as compared to first equipment failure data 101 into a first failure type group 105. Furthermore, in an aspect, system 200 can facilitate a recurrent evaluation (e.g., using evaluation component 220) of previously evaluated data against updated training data that removes (e.g., using removal component 250 described below) one or more miscategorized data items or satisfies adjustments to the one or more determined failure criterion.

In another aspect, second grouping component 210 can also group data subsets from the set of equipment failure data 116 into different equipment failure type groups (e.g., second failure type group, third failure type group, fourth failure type group, etc.) representing one or more different equipment failure type categories. For instance, processor 112 can execute the second grouping component 210 to group a subset of data into GL group 111 (illustrated at FIG. 1D), invalid group 113 (illustrated at FIG. 1D), normal group 115 (illustrated at FIG. 1D), GI group 119 (illustrated at FIG. 1D), SVL group 121 (illustrated at FIG. 1D), FS group 117 (illustrated at FIG. 1D), TVL group 123, DPB group 125 (illustrated at FIG. 1D), UPB group 127 (illustrated at FIG. 1D), SP group 129 (illustrated at FIG. 1D), OTL group (not illustrated) and/or a PS group (not illustrated). In an aspect, the data grouped by second grouping component 210 can comprise one or more data formats such as a graphical representation (e.g., the one or more graph 100D illustrated at FIG. 1D), numerical representation (e.g., sample equipment failure data 100C illustrated at FIG. 1C), and/or other data formats.

In another aspect, evaluation component 220 can utilize a Pearson Correlation co-efficient to determine a level of similarity between subsets of data. As such, evaluation component 220 can utilize a linear correlation technique to compare two variables associated with two subsets of data where such correlation can be indicative of high or low levels of similarity. Thus, evaluation component 220 can base in part a similarity level determination on variable correlations to determine a likelihood a subset of data belongs to a failure type group.

In another aspect, system 200 can include an archiving component 230 that stores the similarity level data 298 comprising the first equipment failure data and the second equipment failure data at a first data store 294. In an aspect, processor 112 can execute the archiving component 230 to store the similarity level data 298 at a readily accessible location (e.g., first data store 294). In an aspect, processor 112 executes archiving component 230 to store the similarity level data 298 at first data store 294 because of the intermediary nature of such data. For instance, in an aspect, the similarity level data 298 can be accessed by various components of grouping system 231 including evaluation component 220, review component 240 (described below), and/or classification component 280 (described below). Furthermore, in an aspect, archiving component 230 can facilitate a storage of similarity level data 298 that has been retrieved from a feed component 290 (described below) or a removal component 250 (described below).

Accordingly, one or more components of grouping system 231 executed by processor 112 can recurrently utilize similarity level data 298 stored and archived (e.g., using archiving component 230) in first data store 294 to perform continuously improved activities. For instance, processor 112 can execute the second grouping component 210 to improve the quality, accuracy, and precision of data in subsequent grouping iterations by accessing (e.g., using archiving component 230) from first data store 294 and utilizing similarity level data 298 that is recurrently refreshed and includes more detailed data signature identifications or eliminates previously grouped data that pursuant to an identification task (e.g., using review component 240) can be identified to have been previously miscategorized or grouped (e.g., using second grouping component 210) incorrectly. As such, similarity level data 298 is stored (e.g., using archiving component 230) at a first data store 294 within a compartmentalized location that can be separate from other data subsets such as first equipment failure data 101 and first failure type group 105 to facilitate efficient data organization and perform expedient data access tasks.

In yet another aspect, system 200 can include a review component 240 that identifies miscategorized data within the first failure type group 105 and a first data store 294 based on pattern matching criterion. In an aspect, processor 112 can execute the review component 240 to identify different curve portions and similar curve portions between two subsets of equipment failure data represented as graphical curves (e.g., one or more graph 100D) and based on various shape patterns of the curves. For instance, a review component 240 can identify based on a comparison of two subsets of equipment failure equipment data and whether the data sets belong within the same failure type groups based on a shape of a graphical representation of the data.

In an aspect, review component 240 can identify from a graphical data pattern a volume of liquid fillage within a pump portion of assembly 100B. In another aspect, review component 240 can identify various angles formed by data curves such as a tube spring constant angle. In yet another aspect, a data set represented by a graphical shape that has a dramatic slope can indicate an equipment efficiency associated with a particular equipment failure type (e.g., failure of a pump, rod, tubing, or gear box of an assembly 100B). In another aspect, review component 240 can also identify whether subsets of grouped data are properly grouped into one or more respective failure type group based on a comparison of data patterns and shape comparisons of graphical representations of data. In another aspect, review component 240 can identify miscategorized data and properly categorized data based on pattern recognition techniques.

Accordingly, processor 112 can execute the review component 240 to conduct a range of identification tasks that act as a mechanism for verifying that already conducted tasks (e.g., grouping, evaluation, archiving, selection, and other such system 200 tasks) by system 200 have been performed accurately, precisely and correctly. Furthermore, in an aspect, review component 240 via identifying potential mistakes that have occurred can coordinate with system 200 components (e.g., evaluation component 220, removal component 250, feed component 290, and system 200 components some of which are described below) to correct such mistakes.

For instance, upon identification of a mistake in categorization or grouping of a data point or subset of data points, review component 240 can communicate such finding to evaluation component 220. Furthermore, in an aspect, evaluation component 220 can adjust the similarity criterion utilized to evaluate the level of similarity between subsets of data utilized in determining the level of similarity. Thus, for example, two curves that present with two similar shapes that would have previously indicated a high level of similarity in accordance with similarity criterion may be adjusted. In an aspect, evaluation component 220 may consider an additional similarity requirement that isolates a nuanced portion of the two curves for comparison that present a sufficient differentiation in shape or data presentation to conclude that the two curves are more dissimilar than similar and should be grouped (e.g., using second grouping component 210) in separate failure type groups.

In another aspect, review component 240 can identify miscategorized data utilizing statistical techniques. For instance, review component 240 can utilize a standard deviation between data of two curves representing failure types to determine whether such curves belong in the same failure type group. Furthermore, review component 240 can utilize a moving average determination for a moving window circumscribing relevant data to determine whether such data can be miscategorized within a group. In an aspect, the identification data identified by review component 240 can be transmitted (e.g., using delivery component 260 described below) to second grouping component 210 for interpolation of the identification data with existing data such that second grouping component 210 can execute more effective grouping tasks on subsequent ungrouped data sets.

In yet another aspect, system 200 can include a removal component 250 that removes the miscategorized data from the first failure type group 105 and the first data store 294 based on pattern matching criterion. In an instance, processor 112 can execute the removal component 250 to remove miscategorized data identified by review component 240 utilizing pattern recognition techniques performed on various sets of data. In an aspect, removal component 250 can facilitate a removal of miscategorized data from respective data storage locations (e.g., first data store 294, third data store 146, second data store 126, and fourth data store 296) but also facilitate transmission (e.g., using delivery component 260 described below) of the miscategorized data to feed component 290 (described below). As such the removed miscategorized data can be utilized for comparison to other ungrouped data of the set of equipment failure data 116 in order to highlight the signatures in the miscategorized data that contributed to stark differences in the data (e.g., graphical shapes representing the data) and a resultant determination of dissimilarity between two subsets of data.

For instance, processor 112 can execute the removal component 250 to remove grouped data from a failure type group based on review component 240 identifying a difference in curve similarity to conclude that a miscategorization or false grouping of data occurred. Furthermore, removal component 250 can utilize identification data from review component 240 to determine whether to remove a subset of data. In another aspect, removal component 250 can transmit (e.g., in connection with delivery component 260 described below) removal data to first data store 294. In an aspect, removal data can represent the previously grouped data that was removed from a group and associated information substantiating the removal of such previously grouped data.

For instance, removal data can include data tags that indicate locations of data curves that contributed to a determination of differentiation between the previously grouped data and other data within the failure type group. In an aspect, removal data can be integrated with similarity level data 298 for use in subsequent and iterative similarity comparisons (e.g., using evaluation component 220) between ungrouped and grouped data subsets. Thus, the task of removing (e.g., using removal component 250) miscategorized data and data samples from one or more failure type group can facilitate an optimization of subsequent grouping tasks (e.g., using second grouping component 210) utilizing comparative and similarity based grouping techniques.

In another aspect, system 200 can include delivery component 260 that transmits reviewed (e.g. identification data generated by review component 240) and grouped (e.g., second equipment failure data 103) equipment failure data to feed component 290. In an aspect, delivery component 260 can facilitate a transmission of data between one or more components of system 200. For instance, feed component 290 can transmit selected equipment failure data for grouping (e.g., using first grouping component 110 or second grouping component 210), but feed component 290 can also transmit identification data (e.g., generated by review component 240) and removal data (e.g., generated by removal component 250) for use in selecting ungrouped data from the set of equipment failure data 116. As such, delivery component 260 can transmit identification data and removal data to feed component 290.

In another aspect, delivery component 260 can transmit similarity level data 298 to review component 240 for use by review component 240 in performing identification tasks. Furthermore, delivery component 260 can facilitate a transmission of removal data from removal component 250 to first data store 294 for integration of removal data with similarity level data 298 such that similarity level data 298 can utilize removal data information to better predict a similarity between two subsets of data. As such delivery component 260 can facilitate iterative tasks by system 200 components such that as one or more subsets of data (e.g., removal data, similarity level data 298, identification data, first equipment failure data 101, second equipment failure data 103, data associated with the set of failure type group 118) throughout system 200 are modified, adjusted, or comprise more accurate and predictive information, such subsets of data can be transmitted and re-transmitted to system 200 components.

For instance, a subset of equipment failure data can be selected (e.g., using selection component 120) from second data store 126 and grouped by second grouping component 210 into a failure type group. However, the same subset of data can be ungrouped or removed (e.g., using removal component 250) from a failure type group and re-grouped (e.g., using second grouping component 210) taking into account removal data, identification data, and similarity level data 298 that is updated during the re-grouping activity. Thus, delivery component 260 can facilitate transmission of one or more subset of data from one component to another component of system 200 to facilitate iterative execution (e.g., using processor 112) of a range of system 200 tasks.

In yet another aspect, system 200 can include generation component 270 that generates a classification framework from the first equipment failure data 101 and the second equipment failure data 103 to facilitate a generation of classification data (e.g., classified failure data 299) for storage at a fourth data store 296. In an aspect, generation component 270 can generate a classification framework to facilitate a determination of similarity between ungrouped data of the set of equipment failure data 116 utilizing a pool of existing grouped equipment failure data (e.g., first equipment failure data 101 and second equipment failure data 103, the set of failure type group 118, and other such grouped data).

In an aspect, processor 112 can execute generation component 270 to build a kernel data site for each equipment failure type and utilize similarity criteria (e.g., using similarity level data 298) associated with each failure type to generate a similarity approach for classifying ungrouped data into failure type groups. For instance, generation component 270 can generate a classification framework that utilizes a classifier framework to classify ungrouped data. The classifier can utilize metrics such as proximity of an ungrouped subset of data from a grouped subset of data to determine the failure type group such ungrouped subset of data should be grouped within.

In yet another aspect, system 200 can include classification component 280 that classifies the first equipment failure data 101, the second equipment failure data 103, or third equipment failure data as classification data (e.g., classified failure data 299) for storage at the fourth data store 296 based on the classification framework. In an aspect, classification component 280 can utilize grouped or ungrouped equipment failure data for classification (e.g., with one or more failure type group) based on the classification framework generated by generation component 270. In an aspect, the classification framework generated by generation component 270 can be a k-nearest neighbor (KNN) pattern recognition model. In an aspect, classification component 280 can utilize a KNN classification framework calculate a proximity of a data subset (e.g., first equipment failure data 101, second equipment failure data 103, third equipment failure data, and other such equipment failure data) for classification in comparison to a grouped representative data point within a failure type group.

In an aspect, classification component 280 can classify ungrouped data points within groups based on its proximity to a representative grouped data point in accordance with the KNN classification framework. Thus ungrouped data of the set of equipment failure data 116 can be compared to a nearest kernel site and classified (e.g., using classification component 280) as classified failure data 299 within the equipment failure group type associated with the nearest kernel site to facilitate efficient and expeditious grouping of data. In an aspect, classified failure data 299 can be stored at fourth data store 296 to facilitate expeditious access (e.g., using archiving component 230) and organized storage of such data. Furthermore, in an aspect, initial grouping tasks can be performed by first grouping component 110 and second grouping component 210 utilizing similarity level comparisons, review tasks (e.g., using review component 240), and removal tasks (e.g., using removal component 250).

In a non-limiting embodiment, classification component 280 can be utilized for classification of ungrouped data after execution by processor 112 of a similarity level based evaluation (e.g., using evaluation component 220) and grouping tasks have been conducted numerous times to procure accurate and precise grouped data within one or more failure type group. In another aspect, similarity based grouping (e.g., using first grouping component 110 and second grouping component 210) and KNN based classification tasks (e.g., using generation component 270 and classification component 280) can be performed by system 200 in combination with one another or executed by processor 112 in parallel. In another aspect, classification component 280 can perform classification tasks on batch subsets of already grouped data such that grouped data can satisfy both similarity based grouping requirements and classification based grouping requirements (e.g., KNN classification criteria). Furthermore, the performance of classification tasks on batch subsets facilitate expedient and efficient classification of larger volumes of data.

In another aspect, system 200 can include a feed component 290 that transmits the first equipment failure data 101 selected (e.g., using selection component 120) from the set of equipment failure data 116 to first grouping component 110 based on the one or more determined failure criterion representative of domain expert user input. Furthermore, in an aspect, system 200 can employ a feed component 290 that transmits the first equipment failure data 101 selected (e.g., using selection component 120) from the set of equipment failure data 116 to first grouping component 110 based on the one or more determined failure criterion.

In an aspect, feed component 290 can transmit equipment failure data between second data store 126 and grouping system 231. In another aspect, the feed component 290 can receive data from one or more components of system 200 and transmit such data to another one or more components of system 200. For instance, feed component 290 can receive data (e.g., first equipment failure data 101 or second equipment failure data 103) from second data store 126 and transmit such data to a second grouping component 210 for grouping into failure type groups (e.g., first failure type group 105). Furthermore, feed component 290 can receive data from review component 240 which can transmit (e.g., using delivery component 260) identification data to feed component 290 and removal data (e.g., using removal component 250) that has been improperly grouped (e.g., using first grouping component 110 or second grouping component 210) into one or more failure type group.

In an aspect, feed component 290 can transmit previously grouped and reviewed data to the first grouping component 110. Accordingly, first grouping component 110 can regroup previously grouped data based on an update to such previously grouped data. An update can include a review (e.g., using review component 240) of the previously grouped data and removal (e.g., using removal component 250) of miscategorized data. In an aspect, first grouping component 110 can adjust or update the one or more determined failure criteria utilized to perform grouping of equipment failure data in order to refine the accuracy and precision of data grouping activities.

Furthermore, processor 112 can execute feed component 290 to iteratively and recurrently transmit previously grouped data to first grouping component 110 to allow for continuous improvement of the data grouping tasks performed by first grouping component 110. In yet another aspect, feed component 290 can receive (e.g., from delivery component 260) data that has been classified (e.g., using classification component 280) and transmit such data to evaluation component 220 for an evaluation of the level of similarity between the classified data and other data within the failure type group such data is classified within. Accordingly, feed component 290 can transmit several data types and data formats received from numerous data sources and transmit them for execution (e.g., using processor 112) of one or more task in association with system 200.

Aspects disclosed herein can be integrated with the tangible and physical infrastructure components of one or more oil and gas exploration equipment at one or more localities. In another aspect the systems and methods disclosed can be integrated with physical devices such as sucker-rod pumping devices, tablets, desktop computers, mobile devices, and other such hardware. Furthermore, the ability to employ iterative machine learning techniques to categorize equipment failure data associated with several oil and gas exploration equipment technologies simultaneously cannot be performed by a human. For example, a human is unable to group equipment failure data from several sucker-rod pumping assemblies simultaneously based on machine learning and artificial intelligence comparative techniques in an efficient and accurate manner. Furthermore, a human is unable to simultaneously access and employ ungrouped equipment failure data, grouped equipment failure data, similarity data associated with grouped and ungrouped equipment failure data, equipment historical trend data, artificial intelligence generated equipment performance data and/or packetized data for communication between a main processor (e.g., using processor 112) and a memory (e.g., memory 108) to simultaneously facilitate the grouping of data associated with thousands of oil and gas exploration equipment technologies simultaneously.

With reference to the above-described figures, in an aspect, data stored in memory 108 can comprise data characteristics that eliminate wasteful information and include information that is most indicative of an equipment failure types to facilitate grouping operations (e.g., using second grouping component 210). For instance, in an aspect, removal component 250 removes miscategorized grouped data and can be utilized by system components (e.g., second grouping component 210) to update criteria for grouping such as focusing on particular areas within a curve (e.g., that plots equipment failure data subsets) that suggests with greater likelihood that a subset of data is part of an equipment failure type group or is not part of an equipment failure type group. As such, data that is highly representative of similarities or dissimilarities between equipment failure types are stored in memory 108, first data store 126, second data store 294, third data store 146, and fourth data store 295.

Furthermore, such data can be classified (e.g., using classification component 280) to include essential and/or relevant data for making determinations associated with the disclosed systems (e.g., grouping, evaluation, similarities, etc.). Thus, the data stored in disclosed data stores and memory 108 can be structured to allow for efficient and expedient retrieval and access of such data. Furthermore, in some embodiments, such data can be void of non-essential data subsets, which allows for efficient storing such data within memory 108 and data store components that may have limited space. In another aspect, the problems of identifying equipment failures using data grouping techniques did not previously exist as oil and gas extraction technology did not previously accommodate the extraction of data associated with mechanical components from oil and gas extraction equipment technologies. Thus, the systems, methods, and computer program products disclosed herein solve new and unique problems that did not previously exist.

In an aspect, the disclosed subject matter allows for the facilitation of a relationship between mechanical equipment components of oil and gas extraction technology and computer-implemented components that identify and group data representing failures associated with the mechanical equipment components. In an aspect, the relationship between mechanical equipment of oil and gas extraction technology and the identification and grouping of failures associated with the mechanical equipment of the oil and gas extraction technology can be integrated to adjust an operation of oil and gas extraction technology based on an identification of mechanical equipment failures as they occur using the grouped and/or classified equipment failure data. For instance, in an aspect, the grouped and/or classified equipment failure data can be utilized by computer-implemented components integrated within mechanical components of assembly 200B (including a processor 112 and a memory 108) to identify an equipment failure as it occurs in assembly 200B. Furthermore, the equipment components of assembly 200B can perform a task in response to the identification of an occurrence of such equipment failure based on the grouped and/or classified data. For example, assembly 200B can halt a transmission of all or some power to one or more of its mechanical equipment components in response to an identification of an equipment failure occurring.

FIG. 3 illustrates a flow diagram of an example, non-limiting computer-implemented method 300 that can facilitate a grouping of training equipment failure data into one or more equipment failure type groups based on one or more determined failure criteria and selecting ungrouped data for grouping into the one or more failure type groups based on a level of similarity between the ungrouped data and the grouped training data in accordance with one or more embodiments described herein.

In an aspect, one or more of the components described in computer-implemented method 300 can be electrically and/or communicatively coupled to one or more devices. Repetitive description of like elements employed in other embodiments described herein is omitted for sake of brevity. In some implementations, at reference numeral 302, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes. At reference numeral 304, the system can select (e.g., using selection component 120) first ungrouped data from the set of equipment failure data (e.g. set of equipment failure data 116) based on a level of similarity (e.g., similarity level data 298) between the first ungrouped data and the training data.

Figure 4:
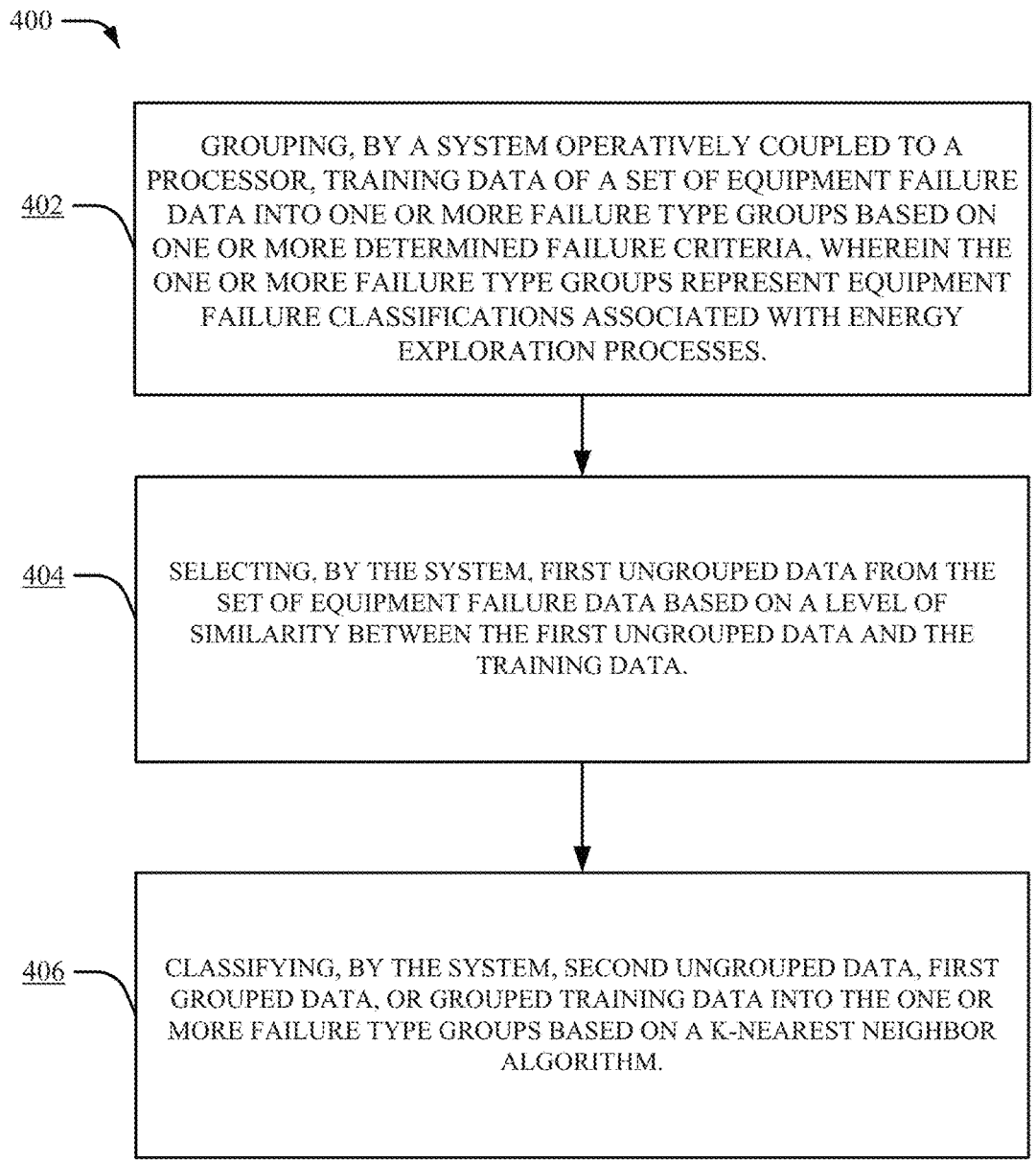
FIG. 4 illustrates a flow diagram of an example, non-limiting computer-implemented method that facilitates a grouping of training equipment failure data into one or more equipment failure type groups based on one or more determined failure criteria and a classifying of ungrouped equipment failure data into one or more failure type group based on a classification algorithm in accordance with one or more embodiments described herein.

FIG. 4 illustrates a flow diagram of an example, non-limiting computer-implemented method 400 that facilitates a grouping of training equipment failure data into one or more equipment failure type groups based on one or more determined failure criteria and a classifying of ungrouped equipment failure data into one or more failure type group based on a classification algorithm in accordance with one or more embodiments described herein.

In an aspect, one or more of the components described in computer-implemented method 400 can be electrically and/or communicatively coupled to one or more devices. Repetitive description of like elements employed in other embodiments described herein is omitted for sake of brevity. In some implementations, at reference numeral 402, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes.

At reference numeral 404, the system can select (e.g., using selection component 120) first ungrouped data from the set of equipment failure data (e.g. set of equipment failure data 116) based on a level of similarity (e.g., similarity level data 298) between the first ungrouped data and the training data. At reference numeral 406, the system can classify (e.g., using classification component 280) second ungrouped data, first grouped data, or grouped training data into the one or more failure type groups (e.g., set of failure type group 118) based on a K-nearest neighbor algorithm.

Figure 5:
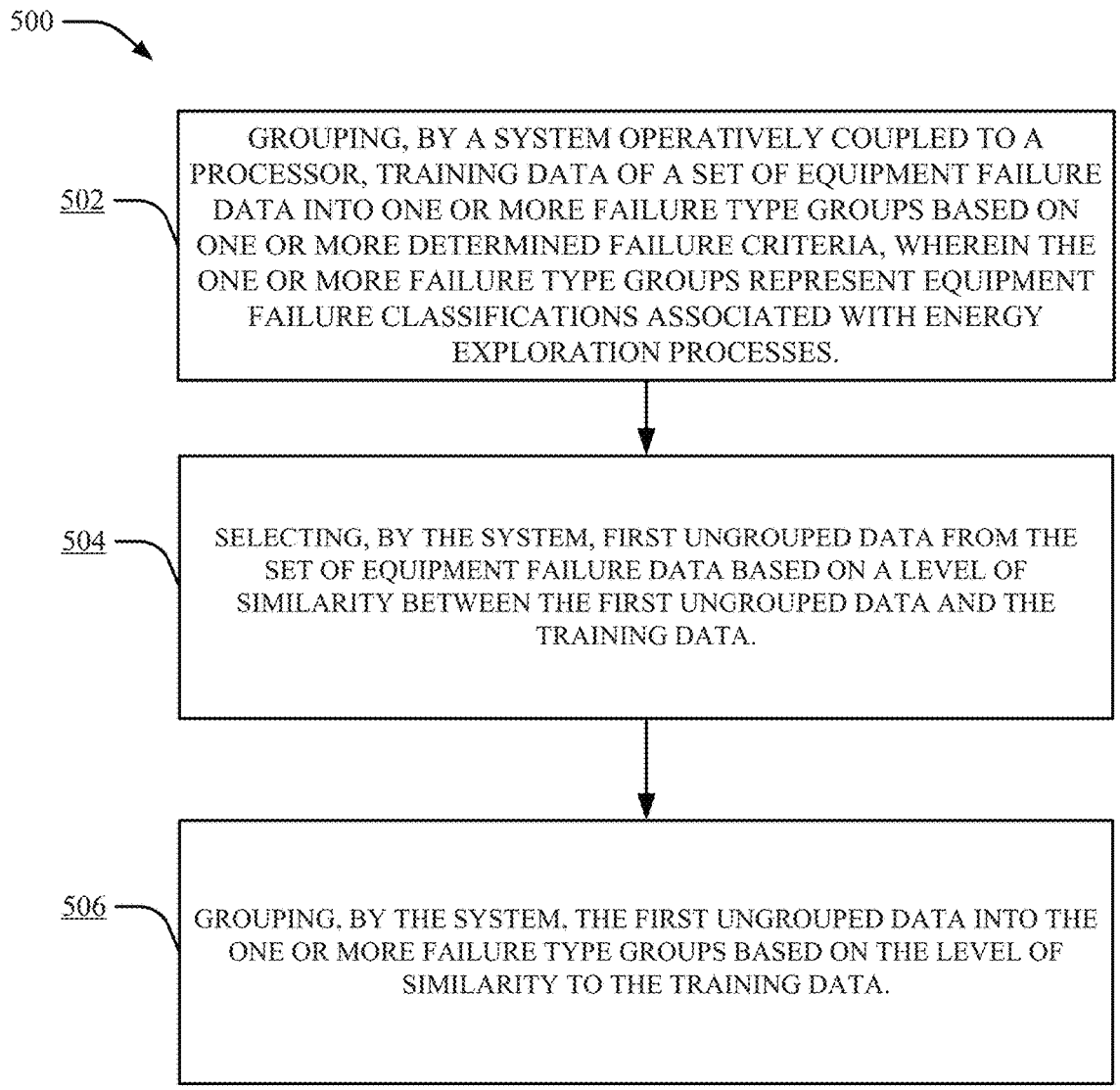
FIG. 5 illustrates a flow diagram of an example, non-limiting computer-implemented method that facilitates a grouping of ungrouped equipment failure data into one or more equipment failure type groups based on a level of similarity between the grouped training equipment failure data and ungrouped equipment failure data in accordance with one or more embodiments described herein.

FIG. 5 illustrates a flow diagram of an example, non-limiting computer-implemented method 500 that facilitates a grouping of ungrouped equipment failure data into one or more equipment failure type groups based on a level of similarity between the grouped training equipment failure data and ungrouped equipment failure data in accordance with one or more embodiments described herein.

In an aspect, one or more of the components described in computer-implemented method 500 can be electrically and/or communicatively coupled to one or more devices. Repetitive description of like elements employed in other embodiments described herein is omitted for sake of brevity. In some implementations, at reference numeral 502, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes. At reference numeral 504, the system can select (e.g., using selection component 120) first ungrouped data from the set of equipment failure data (e.g. set of equipment failure data 116) based on a level of similarity (e.g., similarity level data 298) between the first ungrouped data and the training data. At reference numeral 506, the system can group (e.g., using second grouping component 210) the first ungrouped data into the one or more failure type groups based on the level of similarity to the training data.

Figure 6:
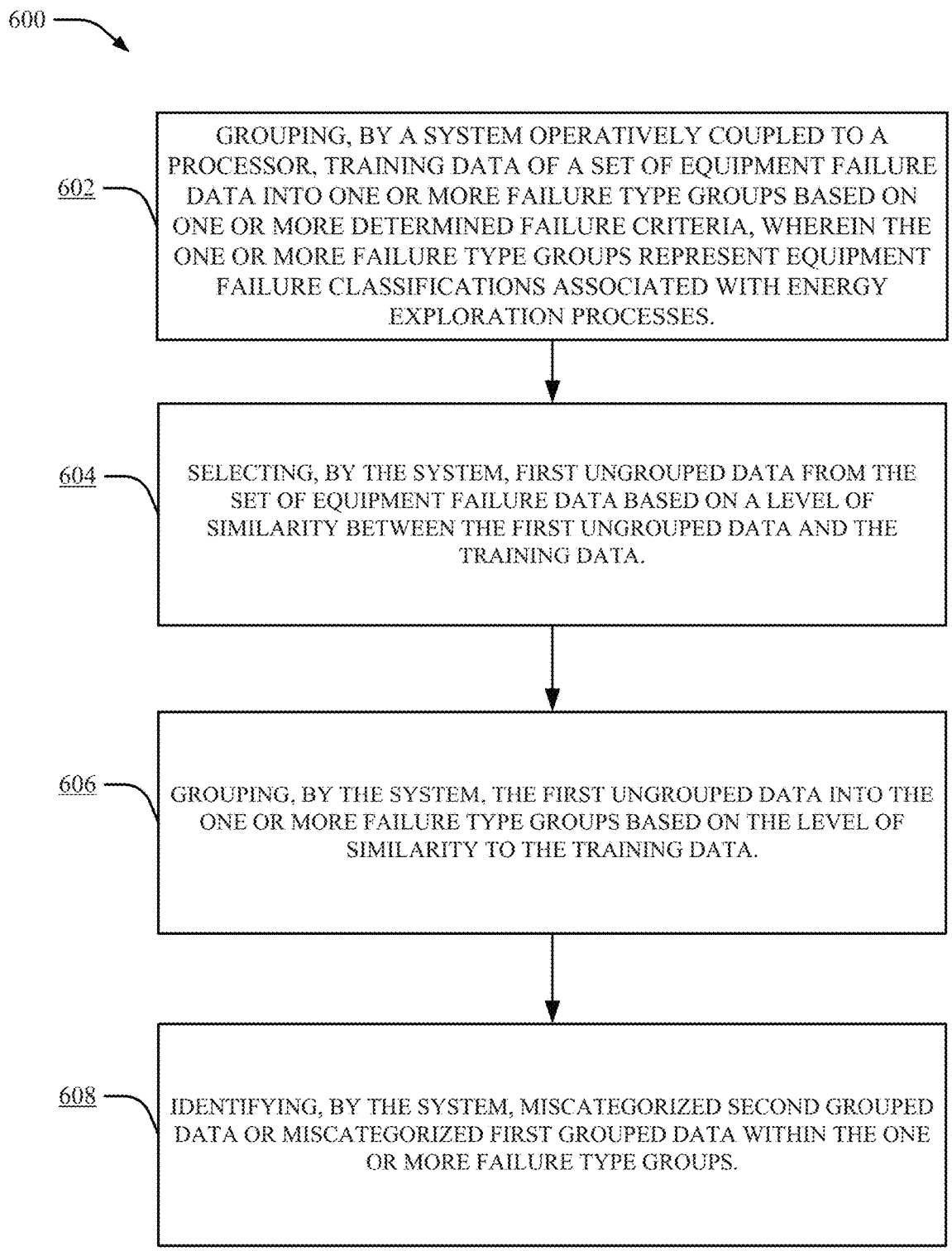
FIG. 6 illustrates a flow diagram of an example, non-limiting computer-implemented method that facilitates a grouping of ungrouped equipment failure data into one or more equipment failure type groups based on a level of similarity between the grouped training equipment failure data and ungrouped equipment failure data and identifying miscategorized grouped data in accordance with one or more embodiments described herein.

FIG. 6 illustrates a flow diagram of an example, non-limiting computer-implemented method 600 that facilitates a grouping of ungrouped equipment failure data into one or more equipment failure type groups based on a level of similarity between the grouped training equipment failure data and ungrouped equipment failure data and identifying miscategorized grouped data in accordance with one or more embodiments described herein.

In an aspect, one or more of the components described in computer-implemented method 800 can be electrically and/or communicatively coupled to one or more devices. Repetitive description of like elements employed in other embodiments described herein is omitted for sake of brevity. In some implementations, at reference numeral 602, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes. At reference numeral 604, the system can select (e.g., using selection component 120) first ungrouped data from the set of equipment failure data (e.g. set of equipment failure data 116) based on a level of similarity (e.g., similarity level data 298) between the first ungrouped data and the training data.

At reference numeral 606, the system can group (e.g., using second grouping component 210) the first ungrouped data into the one or more failure type groups based on the level of similarity to the training data. At reference numeral 608, the system can identify (e.g., using review component 240) miscategorized second grouped data or miscategorized first grouped data within the one or more failure type groups.

Figure 7:
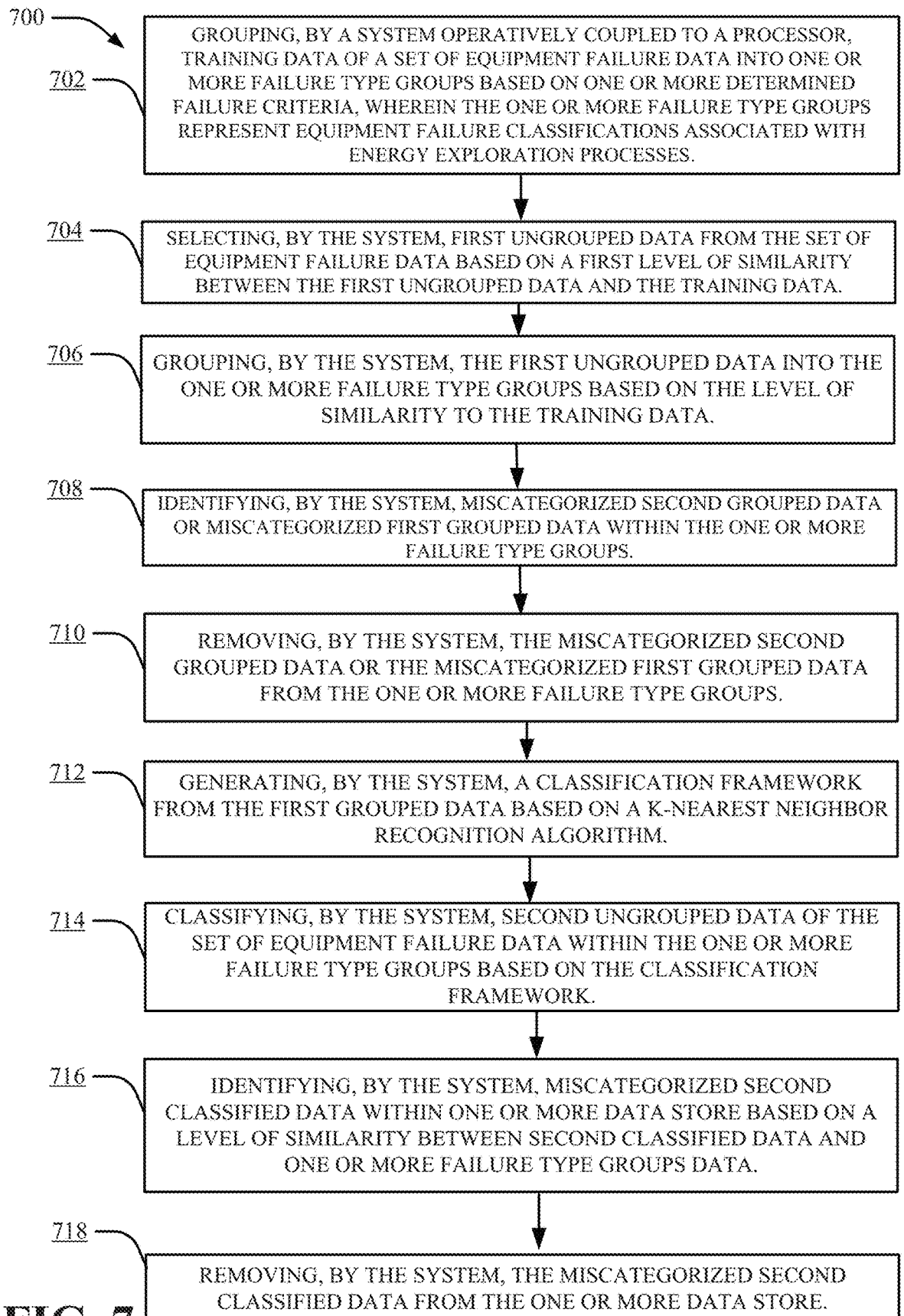
FIG. 7 illustrates a flow diagram of an example, non-limiting computer-implemented method that facilitates a grouping of ungrouped equipment failure data into one or more equipment failure type groups based on a level of similarity between the grouped training equipment failure data and ungrouped equipment failure data and removal of miscategorized grouped data in accordance with one or more embodiments described herein.

FIG. 7 illustrates a flow diagram of an example, non-limiting computer-implemented method 700 that facilitates a grouping of ungrouped equipment failure data into one or more equipment failure type groups based on a level of similarity between the grouped training equipment failure data and ungrouped equipment failure data and removal of miscategorized grouped data in accordance with one or more embodiments described herein.

In an aspect, one or more of the components described in computer-implemented method 700 can be electrically and/or communicatively coupled to one or more devices. Repetitive description of like elements employed in other embodiments described herein is omitted for sake of brevity. In some implementations, at reference numeral 702, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes.

At reference numeral 704, the system can select (e.g., using selection component 120) first ungrouped data from the set of equipment failure data (e.g. set of equipment failure data 116) based on a level of similarity (e.g., similarity level data 298) between the first ungrouped data and the training data. At reference numeral 706, the system can group (e.g., using second grouping component 210) the first ungrouped data into the one or more failure type groups based on the level of similarity to the training data. At reference numeral 708, the system can identify (e.g., using review component 240) miscategorized second grouped data or miscategorized first grouped data within the one or more failure type groups. At reference numeral 710, the system can remove (e.g. using removal component 250) the miscategorized second grouped data or the miscategorized first grouped data from the one or more failure type groups.

At reference numeral 712, the system can generate (e.g., using generation component 270) a classification framework from the first grouped data based on a K-nearest neighbor recognition algorithm. At reference numeral 714, the system can classify (e.g., using classification component 280) second ungrouped data of the set of equipment failure data within the one or more failure type groups based on the classification framework. At reference numeral 716, the system can identify (e.g., using review component 240) miscategorized second classified data within one or more data store based on a second level of similarity between second classified data and one or more failure type groups data. At reference numeral 718, the system can remove, the miscategorized second classified data from the one or more data store.

Figure 8A:
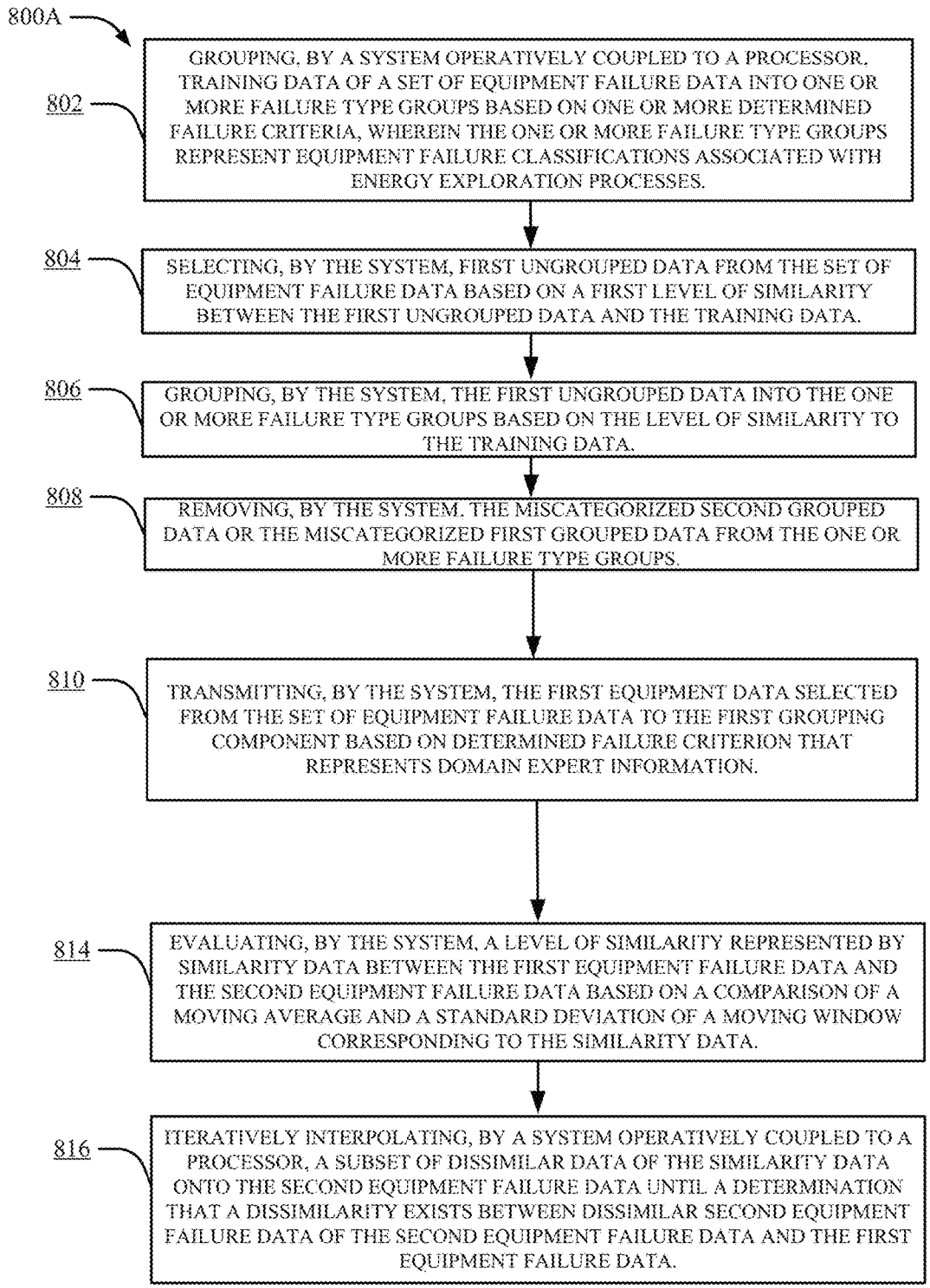
FIG. 8A illustrates a flow diagram of an example, non-limiting computer-implemented method that facilitates an iterative grouping of equipment failure data in accordance with one or more embodiments described herein.

FIG. 8A illustrates a flow diagram of an example, non-limiting computer-implemented method 800A that facilitates an iterative grouping of equipment failure data in accordance with one or more embodiments described herein.

In an aspect, one or more of the components described in computer-implemented method 800 can be electrically and/or communicatively coupled to one or more devices. Repetitive description of like elements employed in other embodiments described herein is omitted for sake of brevity. In some implementations, at reference numeral 802, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes.

At reference numeral 804, the system can select (e.g., using selection component 120) first ungrouped data from the set of equipment failure data (e.g. set of equipment failure data 116) based on a level of similarity (e.g., similarity level data 298) between the first ungrouped data and the training data. At reference numeral 806, the system can group (e.g., using second grouping component 210) the first ungrouped data into the one or more failure type groups based on the level of similarity to the training data. At reference numeral 808, the system can remove (e.g. using removal component 250) the miscategorized second grouped data or the miscategorized first grouped data from the one or more failure type groups.

At reference numeral 810, the system can transmit (e.g., using feed component 290) the first equipment data selected from the set of equipment failure data to the first grouping component 110 based on determined failure criterion that represents domain expert information. At reference numeral 814, the system can evaluate (e.g., using evaluation component 220) a level of similarity represented by similarity data between the first equipment failure data and the second equipment failure data based on a comparison of a moving average and a standard deviation of a moving window corresponding to the similarity data. At reference numeral 816, the system can iteratively interpolate (e.g., using review component 240) a subset of dissimilar data of the similarity data onto the second equipment failure data until a determination that a dissimilarity exists between dissimilar second equipment failure data of the second equipment failure data and the first equipment failure data.

Figure 8B:
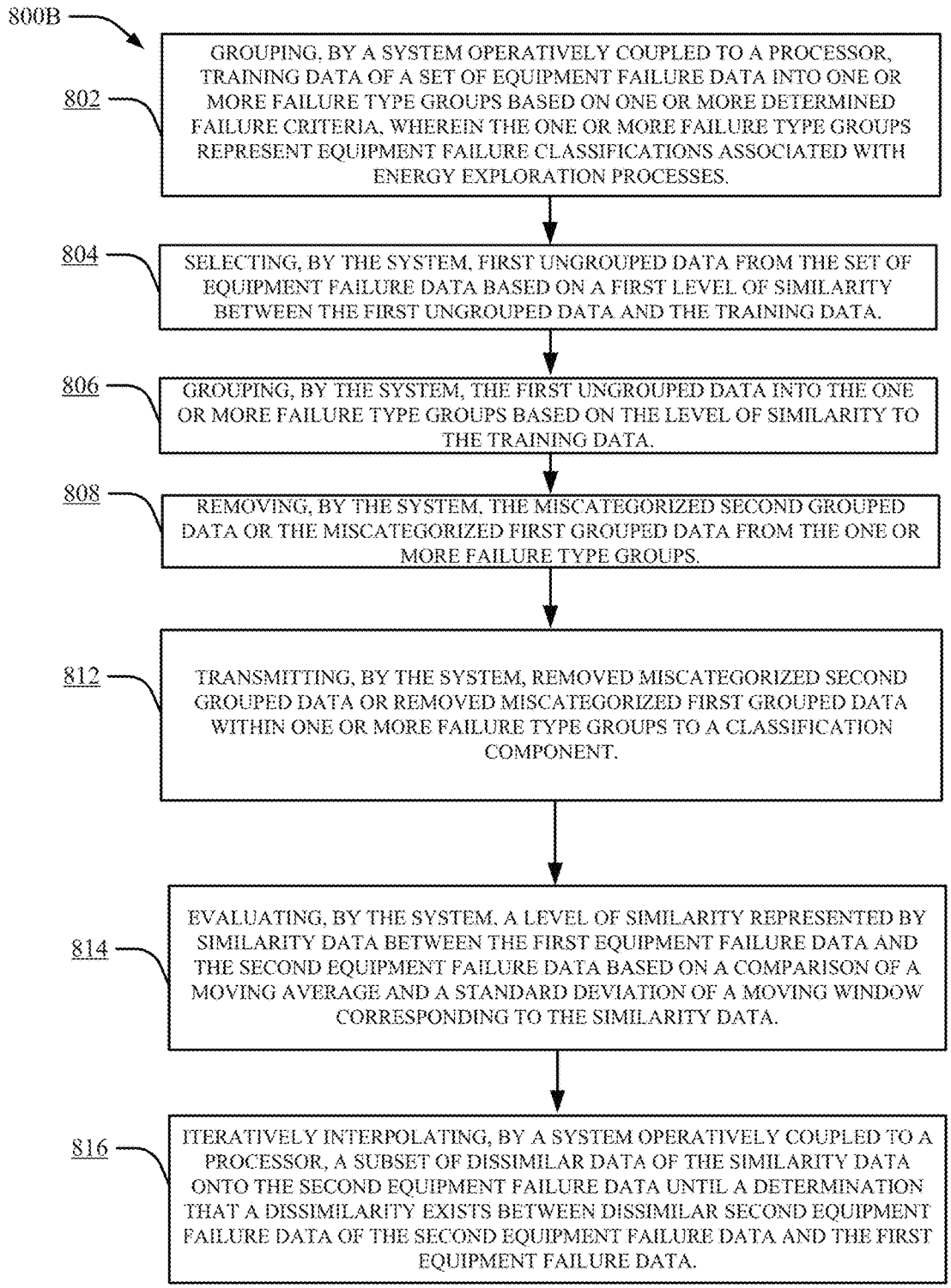
FIG. 8B illustrates a flow diagram of an example, non-limiting computer-implemented method that facilitates an iterative classifying of equipment failure data in accordance with one or more embodiments described herein.

FIG. 8B illustrates a flow diagram of an example, non-limiting computer-implemented method 800B that facilitates an iterative classifying of equipment failure data in accordance with one or more embodiments described herein.

In an aspect, one or more of the components described in computer-implemented method 800 can be electrically and/or communicatively coupled to one or more devices. Repetitive description of like elements employed in other embodiments described herein is omitted for sake of brevity. In some implementations, at reference numeral 802, a system operatively coupled to a processor (e.g., processor 112) can group (e.g., using first grouping component 110) training data (e.g., first equipment failure data 101) of a set of equipment failure data (e.g. set of equipment failure data 116) into one or more failure type groups (e.g., set of failure type group 118) based on one or more determined failure criteria, wherein the one or more failure type groups represent equipment failure classifications associated with energy exploration processes.

At reference numeral 804, the system can select (e.g., using selection component 120) first ungrouped data from the set of equipment failure data (e.g. set of equipment failure data 116) based on a level of similarity (e.g., similarity level data 298) between the first ungrouped data and the training data. At reference numeral 806, the system can group (e.g., using second grouping component 210) the first ungrouped data into the one or more failure type groups based on the level of similarity to the training data. At reference numeral 808, the system can remove (e.g. using removal component 250) the miscategorized second grouped data or the miscategorized first grouped data from the one or more failure type groups. At reference numeral 812, the system can transmit (e.g., using feed component 290) removed miscategorized second grouped data or removed miscategorized first grouped data within one or more failure type groups to a classification component (e.g., classification component 280).

At reference numeral 814, the system can evaluate (e.g., using evaluation component 220) a level of similarity represented by similarity data between the first equipment failure data and the second equipment failure data based on a comparison of a moving average and a standard deviation of a moving window corresponding to the similarity data. At reference numeral 816, the system can iteratively interpolate (e.g., using review component 240) a subset of dissimilar data of the similarity data onto the second equipment failure data until a determination that a dissimilarity exists between dissimilar second equipment failure data of the second equipment failure data and the first equipment failure data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because a grouping of data is performed utilizing iterative machine learning and artificial intelligence techniques that facilitate a recurrent and precise grouping of equipment failure data into failure type groups based on similarity comparisons is performed by components executed by a processor (e.g., processor 112) established from a combination of electrical and mechanical components and circuitry, a human is unable to replicate or perform the subject data packet configuration and/or the subject communication between processing components, a first grouping component and/or a selection component. Furthermore, the similarity comparisons between grouped and ungrouped data sets are based on comparative determinations that only a computer can perform such as iterative grouping, evaluation, and review of equipment failure data based on unique signatures within the data and use of computer-implemented operations to recognize digital patterns within computer generated data representations to iteratively group data into equipment failure type groups.

The generation of digital data based on pattern recognition algorithms and data similarity algorithms as well as storage and retrieval of digitally generated data to and from a memory (e.g., using memory 108) in accordance with computer generated access patterns cannot be replicated by a human.

Figure 9:
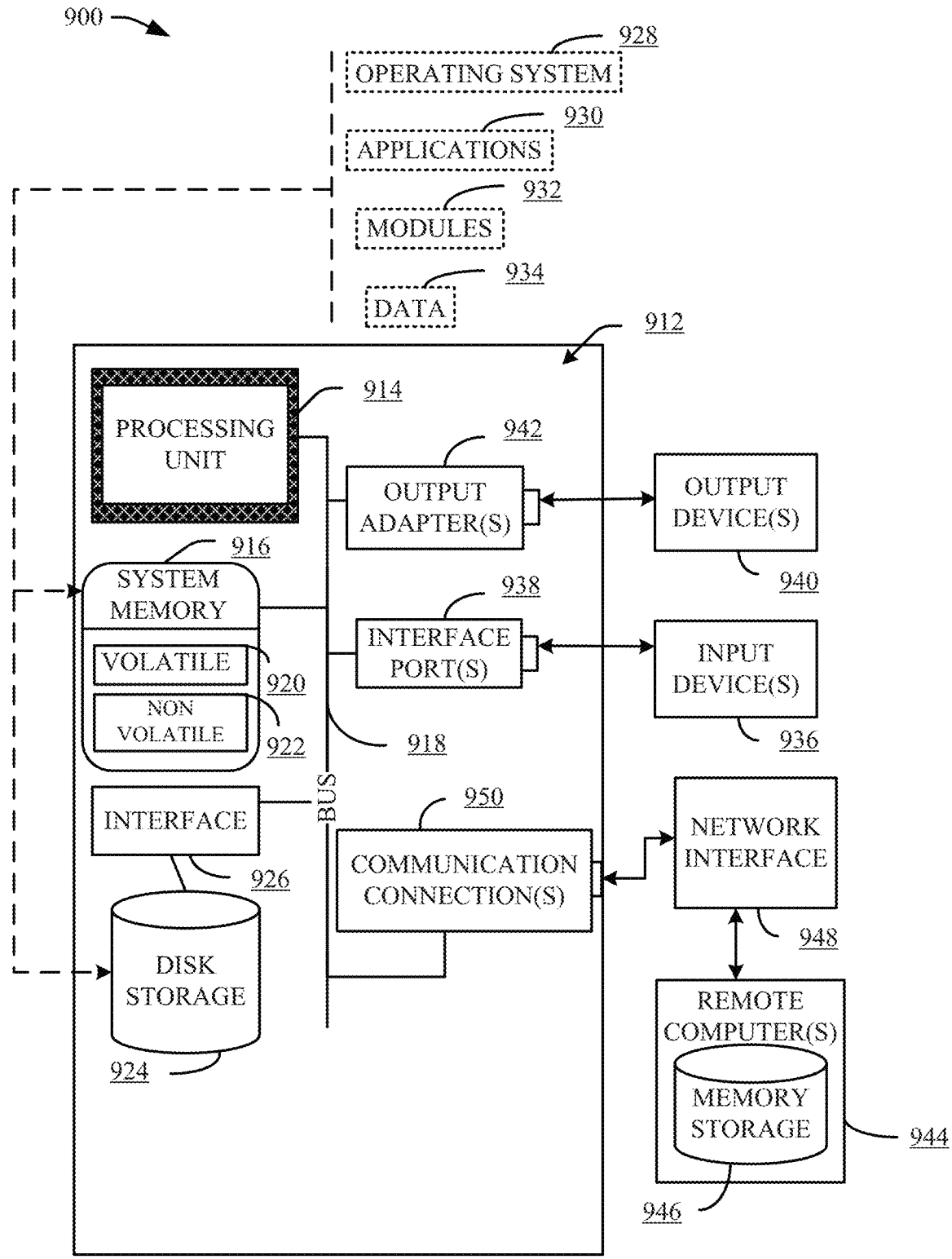
FIG. 9 illustrates a block diagram of an example, non-limiting operating environment in which one or more embodiments described herein can be facilitated.

In order to provide a context for the various aspects of the disclosed subject matter, FIG. 9 as well as the following discussion is intended to provide a general description of a suitable environment in which the various aspects of the disclosed subject matter can be implemented. FIG. 9 illustrates a block diagram of an example, non-limiting operating environment in which one or more embodiments described herein can be facilitated. With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 1242 is provided to illustrate that there are some output device 940 like monitors, speakers, and printers, among other such output device 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    grouping, by a system operatively coupled to a processor, a training data of a set of equipment failure data into one or more failure type groups based on one or more determined failure criteria, wherein the one or more failure type groups represent equipment failure classifications associated with energy exploration processes;
    identifying, by the system, a fluid traversing from a first position to a second position, wherein an equipment assembly including one or more capacitors to increase one or more power factors, wherein the determined failure criterion comprises an average reactive power data; and
    selecting, by the system, first ungrouped data from the set of equipment failure data based on a level of similarity between the first ungrouped data and the training data.

2. The computer-implemented method of claim 1, further comprising a classifying, by the system, a second ungrouped data, the first grouped data, or grouped the training data into the one or more failure type groups based on a k-nearest neighbor algorithm, wherein the classifying facilitates an efficient access of the first grouped data from a memory or a archive database based on data access patterns associated with the classifying.

3. The computer-implemented method of claim 1, further comprising grouping, by the system, the first ungrouped data into the one or more failure type groups based on the level of similarity to the training data.

4. The computer-implemented method of claim 1, further comprising identifying, by the system, miscategorized a second grouped data or miscategorized the first grouped data within the one or more failure type groups.

\* \* \* \* \*